US012436486B2

(12) United States Patent
Ikeda et al.

(10) Patent No.: US 12,436,486 B2
(45) Date of Patent: Oct. 7, 2025

(54) FIXING DEVICE INCLUDING A CONDUCTOR CONTACTING AN INNER SURFACE OF A FIXING ROTATOR

(71) Applicants: Tamotsu Ikeda, Tokyo (JP); Yutaka Ikebuchi, Kanagawa (JP); Yuusuke Furuichi, Kanagawa (JP); Seiji Saitoh, Kanagawa (JP); Jun Okamoto, Tokyo (JP)

(72) Inventors: Tamotsu Ikeda, Tokyo (JP); Yutaka Ikebuchi, Kanagawa (JP); Yuusuke Furuichi, Kanagawa (JP); Seiji Saitoh, Kanagawa (JP); Jun Okamoto, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/605,881

(22) Filed: Mar. 15, 2024

(65) Prior Publication Data

US 2024/0319636 A1 Sep. 26, 2024

(30) Foreign Application Priority Data

Mar. 22, 2023 (JP) ................................ 2023-045111

(51) Int. Cl.
*G03G 15/20* (2006.01)

(52) U.S. Cl.
CPC ..... *G03G 15/2017* (2013.01); *G03G 15/2053* (2013.01)

(58) Field of Classification Search
CPC ........... G03G 15/2017; G03G 15/2053; G03G 2215/2016; G03G 2215/2035; B65G 2207/10
USPC ............................................ 399/329; 474/90
See application file for complete search history.

(56) References Cited

U.S. PATENT DOCUMENTS

2005/0163540 A1* 7/2005 Umezawa .......... G03G 15/2053 399/328
2014/0286684 A1* 9/2014 Takagi ............... G03G 15/2053 399/329
2017/0023897 A1* 1/2017 Sakurai .............. G03G 15/2053
2018/0120743 A1* 5/2018 Arakawa ............ G03G 15/2053
2023/0168613 A1* 6/2023 Nanno ............... G03G 15/2053 399/330
2023/0236532 A1* 7/2023 Nanno ............... G03G 15/2042 399/309
2023/0375966 A1 11/2023 Nanno
2024/0069476 A1* 2/2024 Yokota ............... G03G 15/2053
(Continued)

FOREIGN PATENT DOCUMENTS

JP 2014-016603 A 1/2014
JP 2016-142747 A 8/2016
JP 2023-170922 A 12/2023

*Primary Examiner* — Robert B Beatty
(74) *Attorney, Agent, or Firm* — XSENSUS LLP

(57) ABSTRACT

A fixing device includes a fixing rotator, a pressure rotator, a planar heater, a holder, a conductor, and a support. The pressure rotator presses the fixing rotator to form a fixing nip between the pressure rotator and the fixing rotator. The planar heater contacts an inner surface of the fixing rotator. The holder holds the heater and guides the fixing rotator. The conductor is grounded and contacts the inner surface of the fixing rotator. The support supports the holder and has a shape of regulating rotation of the conductor.

20 Claims, 23 Drawing Sheets

(56) References Cited

U.S. PATENT DOCUMENTS

| | | | | |
|---|---|---|---|---|
| 2024/0241467 | A1* | 7/2024 | Ikebuchi | G03G 15/2053 |
| 2024/0248426 | A1* | 7/2024 | Takagi | G03G 15/2053 |

* cited by examiner

FIXING DEVICE INCLUDING A CONDUCTOR CONTACTING AN INNER SURFACE OF A FIXING ROTATOR

CROSS-REFERENCE TO RELATED APPLICATION

This patent application is based on and claims priority pursuant to 35 U.S.C. § 119(a) to Japanese Patent Application No. 2023-045111, filed on Mar. 22, 2023, in the Japan Patent Office, the entire disclosure of which is hereby incorporated by reference herein.

BACKGROUND

Technical Field

The present disclosure relates to a fixing device and an image forming apparatus.

Related Art

A fixing device includes a fixing belt as a fixing rotator, a heater that contacts an inner surface of the fixing belt to heat the fixing belt, and a pressure roller that presses the fixing belt. One type of this heater exists which generates heat by applying an AC (alternating current) voltage to a resistive heat generator formed on a base, and thus heats the inner surface of the fixing belt via an insulation layer or the like.

In a configuration in which the AC voltage is applied to the heater, the insulation layer provided to the heater and a surface layer of the fixing belt are equivalent to parts of a capacitor, and the AC voltage is applied to a fixing nip via the fixing belt. In a state where a sheet in contact with both a transfer nip and the fixing nip, the AC voltage is transmitted via the sheet to the transfer nip. As a result, the AC voltage affects the transfer electric field and causes periodic density unevenness in the transferred image, that is, so-called banding artifacts. In particular, in a case where the sheet P has low resistance, for example, in a high-humidity environment or when a thin sheet is used as the sheet, the above-described disadvantage is likely to occur.

By contrast, a conventional fixing device exists which includes a conductor that contacts the inner surface of the fixing belt so as to pass the current via the conductor to the ground. For example, in such a fixing device, the other end of the conductor having one end fixed to the metal stay is brought into contact with the inner surface of the fixing belt.

Incidentally, in the configuration in which the conductor is brought into contact with the fixing rotator as described above, there is a disadvantage in that, when the conductor is to be attached to a stay serving as a support, the conductor moves and cannot be properly fixed.

SUMMARY

A fixing device includes a fixing rotator, a pressure rotator, a planar heater, a holder, a conductor, and a support. The pressure rotator presses the fixing rotator to form a fixing nip between the pressure rotator and the fixing rotator. The planar heater contacts an inner surface of the fixing rotator. The holder holds the heater and guides the fixing rotator. The conductor is grounded and contacts the inner surface of the fixing rotator. The support supports the holder and has a shape of regulating rotation of the conductor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 4A and 4B are schematic diagrams illustrating an example of a contact state between a conductor and a fixing belt, of which FIG. 4A illustrates a normal position of the conductor, and FIG. 4B illustrates an example of an inclined position of the conductor;

Figure 1:
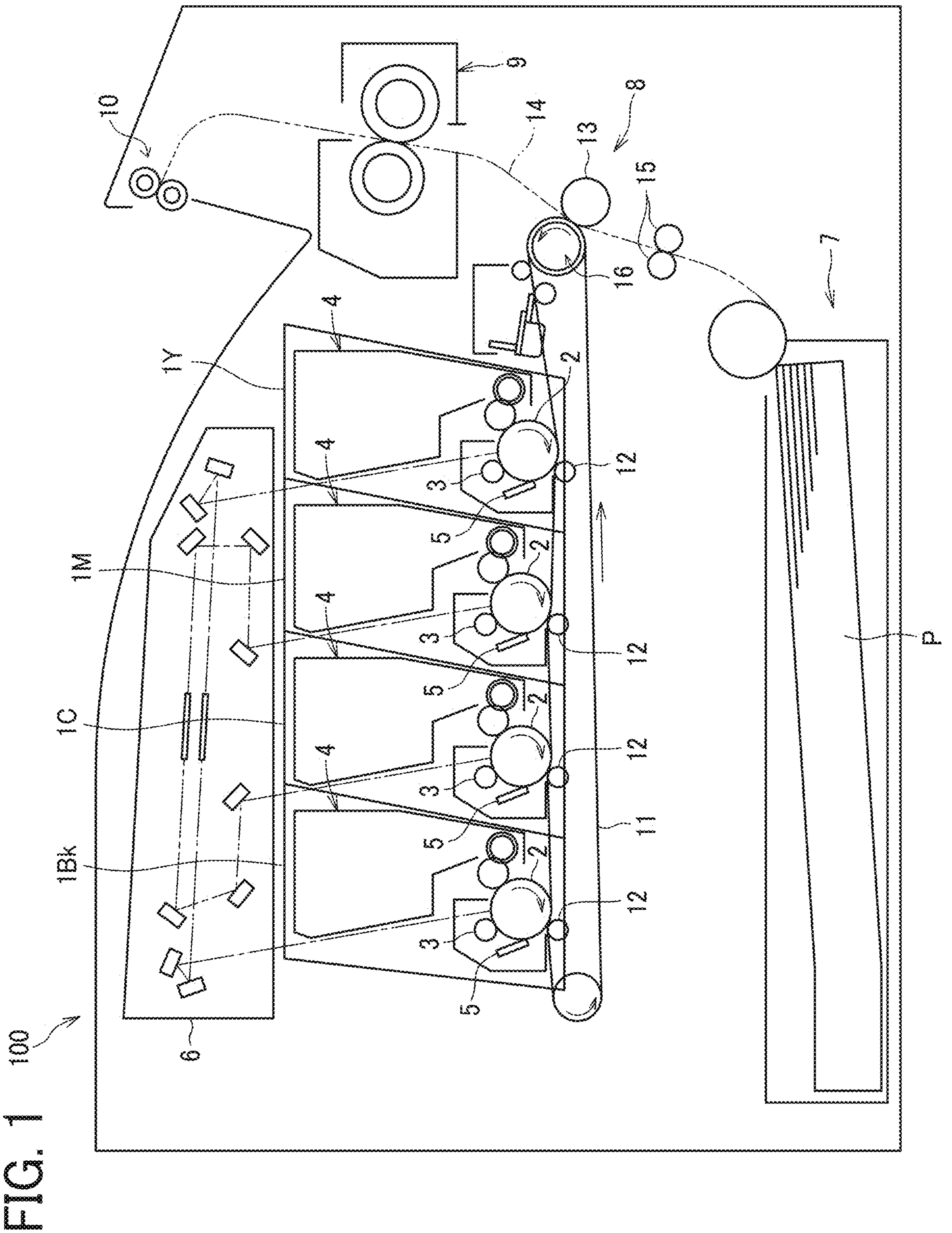
FIG. 1 is a schematic view of a configuration of an image forming apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present invention will be described hereinbelow with reference to the drawings. Note that, in the drawings to illustrate embodiments of the present invention, the same reference signs are assigned to constituent elements, such as members and constituent parts, which have the same function or shape, and redundant descriptions thereof are omitted below.

FIG. 1 is a schematic view of an image forming apparatus according to an embodiment of the present invention.

An image forming apparatus 100, which is illustrated in FIG. 1, includes four image forming units 1Y, 1M, 1C, and 1Bk that are detachably attached to the main body of the image forming apparatus. The image forming units 1Y, 1M, 1C, and 1Bk have substantially the same configuration except for containing developers of different colors, namely, yellow (Y), magenta (M), cyan (C), and black (Bk) toners, respectively. These color developers correspond to color separation components of full-color images. The image forming units 1Y, 1M, 1C, and 1Bk each include a drum-shaped photoconductor 2 as an image bearer, a charging device 3, a developing device 4, and a cleaner 5. The charging device 3 charges the surface of the photoconductor 2. The developing device 4 supplies toner as the developer to the surface of the photoconductor 2 to form a toner image. The cleaner 5 cleans the surface of the photoconductor 2.

The image forming apparatus 100 includes an exposure device 6, a sheet feeder 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner images, which have been transferred onto the sheet P, to the surface of the sheet P. The sheet ejection device 10 ejects the sheet P outside the image forming apparatus 100. The image forming units 1Y, 1M, 1C, and 1Bk, the photoconductors 2, the charging devices 3, the exposure device 6, the transfer device 8, and the like, constitute an image forming device for forming a toner image on the sheet P.

The transfer device 8 includes an endless intermediate transfer belt 11 serving as an intermediate transferor, four primary transfer rollers 12 serving as primary transferors, and a secondary transfer roller 13 serving as a secondary transferor. The intermediate transfer belt 11 is stretched by a plurality of rollers. The primary transfer rollers 12 transfer the toner image on each of the photoconductors 2 onto the intermediate transfer belt 11. The secondary transfer roller 13 transfers the toner image transferred onto the intermediate transfer belt 11 onto the sheet P. The plurality of primary transfer rollers 12 are in contact with the respective photoconductors 2 via the intermediate transfer belt 11. Thus, the intermediate transfer belt 11 contacts each of the photoconductors 2, thus forming a primary transfer nip between the intermediate transfer belt 11 and each of the photoconductors 2. Meanwhile, the secondary transfer roller 13 contacts, via the intermediate transfer belt 11, one of the rollers around which the intermediate transfer belt 11 is stretched. Thus, a secondary transfer nip is formed between the secondary transfer roller 13 and the intermediate transfer belt 11.

A timing roller pair 15 is disposed between the sheet feeder 7 and the secondary transfer nip (the secondary transfer roller 13) on the sheet conveyance path 14.

The print operation by the aforementioned image forming apparatus will be described next with reference to FIG. 1.

In the event of an instruction to start the print operation, in each of the image forming units 1Y, 1M, 1C, and 1Bk, the photoconductor 2 is driven to rotate clockwise in FIG. 1, and the charging device 3 charges the surface of the photoconductor 2 uniformly at a high electric potential. Next, the exposure device 6 exposes the surface of each photoconductor 2 on the basis of image information of a document read by a document reading device or print information for which there is a print instruction from a terminal. Thus, the potential of the exposed portion is reduced, and an electrostatic latent image is formed. The developing device 4 supplies toner to the electrostatic latent image, thus forming a toner image on the photoconductor 2.

The toner image formed on each of the photoconductors 2 reaches the primary transfer nip (the position of the primary transfer rollers 12) in accordance with the rotation of each of the photoconductors 2. The toner images are sequentially transferred and superimposed onto the intermediate transfer belt 11 that is driven to rotate counterclockwise in FIG. 1. Thereafter, the toner image thus transferred onto the intermediate transfer belt 11 is conveyed to a secondary transfer nip (the position of the secondary transfer roller 13) in accordance with the rotation of the intermediate transfer belt 11. The toner image is transferred onto the sheet P that has been conveyed in the secondary transfer nip. The sheet P is supplied from the sheet feeder 7. The timing roller pair 15 temporarily halts the sheet P supplied from the sheet feeder 7, and subsequently conveys the sheet P to the secondary transfer nip at a time when the toner image on the intermediate transfer belt 11 reaches the secondary transfer nip. Accordingly, the sheet P bears the full color toner image thereon. After the toner image is transferred, each cleaner 5 removes toner remaining on each photoconductor 2 therefrom.

The sheet Ponto which the toner image has been transferred is conveyed to the fixing device 9, and the toner image is fixed to the sheet P by the fixing device 9. Thereafter, the sheet ejection device 10 ejects the sheet P to outside the apparatus, and the series of print operations is complete.

Next, a configuration of the fixing device is described.

Figure 2:
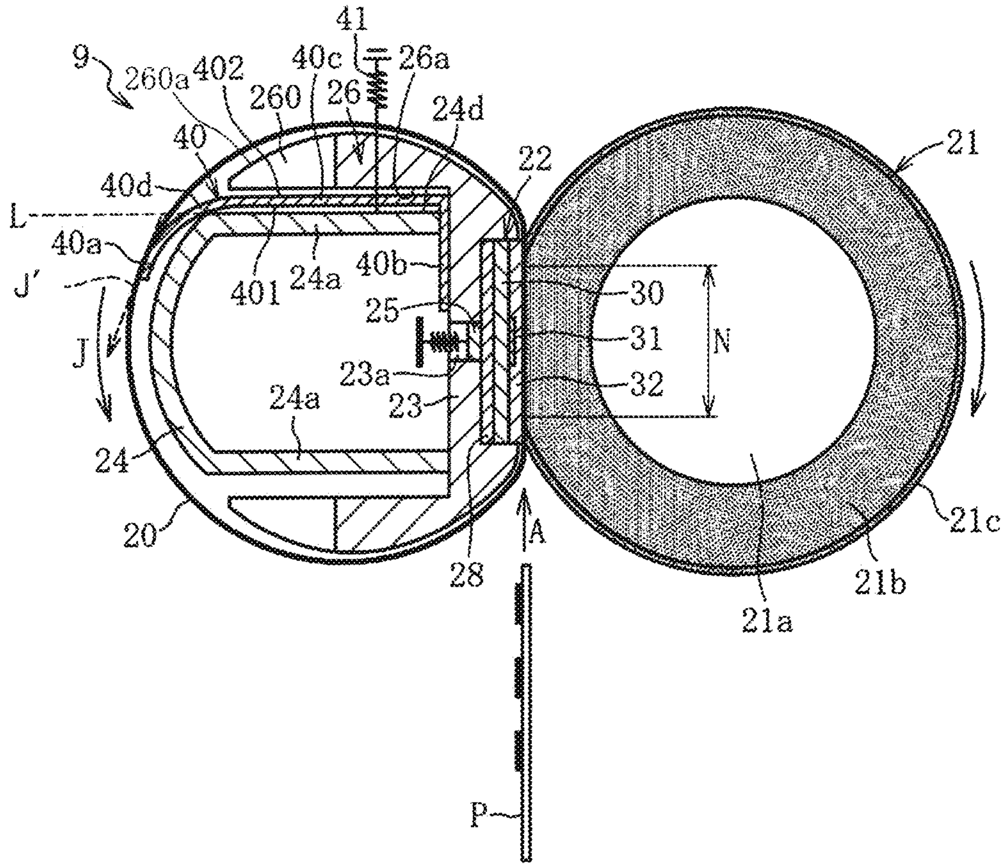
FIG. 2 is a schematic view of a configuration of a fixing device.

As illustrated in FIG. 2, the fixing device 9 according to the present embodiment includes a fixing belt 20 as a fixing rotator or a fixer, a pressure roller 21 as an opposing rotator or a pressure rotator, a heater 22 as a heater, a heater holder 23 as a holder, a stay 24 as a support, a thermistor 25 as a temperature detector, a first high thermal conductor 28, and a conductor 40. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conductor 28. The fixing device 9 is detachably attached to the image forming apparatus.

A direction orthogonal to the plane on which FIG. 2 is drawn is the longitudinal direction of the fixing belt 20, the pressure roller 21, the heater 22, the heater holder 23, the stay 24, and the first high thermal conductor 28, and is indicated by a double-headed arrow X in FIGS. 5A to 5D and so forth. Hereinafter, this direction is simply referred to as the longitudinal direction. Note that the longitudinal direction is also the width direction of the sheet P conveyed, the belt width direction of the fixing belt 20, and the axial direction of the pressure roller 21. The direction indicated by arrow A in FIG. 2 is the sheet conveyance direction. Hereinafter, the upstream side in the sheet conveyance direction, which is the lower side in FIG. 2, is simply referred to as the upstream side, and the downstream side in the sheet conveyance direction, which is the upper side in FIG. 2 is simply referred to as the downstream side. The fixer provided to the fixing device is one aspect of the fixing rotator. The fixing device 9 according to the present embodiment includes the fixing belt 20 as a specific example of the fixer. The stay 24 is one aspect of a first opposing member, and is also a support that supports the holder.

The fixing belt 20 includes a base layer configured by, for example, a tubular base made of polyimide (PI), the tubular base having an outer diameter of 25 mm and a thickness from 40 to 120 μm. The fixing belt 20 further includes, as the outermost surface layer thereof, a release layer which is made of a fluororesin such as tetrafluoroethylene-perfluoroalkylvinylether copolymer (PFA) or polytetrafluoroethylene (PTFE) and which has a thickness in a range of from 5 to 50 μm to enhance durability and facilitate separation. An elastic layer made of rubber having a thickness of from 50 to 500 μm may be interposed between the base and the release layer. The fixing belt 20 according to the present embodiment may be a rubberless belt not including an elastic layer. The base of the fixing belt 20 is not limited to PI and may instead be made of a heat resistant resin such as polyetheretherketone (PEEK) or metal such as nickel (Ni) or steel use stainless (SUS). The inner circumferential surface of the fixing belt 20 may be coated with PI or PTFE as a slide layer.

The pressure roller 21 has, for example, an outer diameter of 25 mm, a solid iron core 21*a*, an elastic layer 21*b* formed on the surface of the core 21*a*, and a release layer 21*c* formed on the outer side of the elastic layer 21*b*. The elastic layer 21*b* is made of silicone rubber and has a thickness of 3.5 mm, for example. In order to improve separation performance, a release layer 21*c* made of a fluororesin and having a thickness of about 40 micrometers, for example, is preferably formed on the surface of the elastic layer 21*b*.

The pressure roller 21 is biased toward the fixing belt 20 by a biasing member, and the pressure roller 21 presses against the heater 22 via the fixing belt 20. Thus, the fixing nip N, which serves as a nip portion, is formed between the fixing belt 20 and the pressure roller 21. The pressure roller 21 is configured to be driven and rotated by a driver, and in step with the rotation of the pressure roller 21 in the direction indicated by the arrow in FIG. 2, the fixing belt 20 is driven and rotated in the direction indicated by the arrow J.

The heater 22 is disposed so as to contact the inner circumferential surface of the fixing belt 20. The heater 22 according to the present embodiment contacts the pressure roller 21 via the fixing belt 20 and serves as a nip former that forms the fixing nip N between the pressure roller 21 and the fixing belt 20. The fixing belt 20 is a heated member heated by the heater 22.

The heater 22 is a planar heater provided in a longitudinal shape, extending in the width direction of the fixing belt 20. The heater 22 includes a plate-shaped base 30, a resistive heat generator 31 provided atop the base 30, and an insulation layer 32 covering the resistive heat generator 31. A power supply 200 (see FIG. 13) applies an alternating current (AC) voltage to the heater 22, and thus the resistive heat generator 31 mainly generates heat and heats the fixing belt 20.

The insulation layer 32 of the heater 22 contacts the inner circumferential surface of the fixing belt 20, and the heat generated by the resistive heat generator 31 is transmitted to the fixing belt 20 through the insulation layer 32. However, this contact may be contact via a member such as a sliding sheet. Although, in the present embodiment, the resistive heat generator 31 and the insulation layer 32 are arranged on the side of the base 30 facing the fixing belt 20 (on the fixing nip N side), the resistive heat generator 31 and the insulation layer 32 may be arranged on the opposite side of the base 30, that is, on the heater holder 23 side. In this case, because the heat of the resistive heat generator 31 is transmitted to the fixing belt 20 through the base 30, it is preferable that the base 30 be made of a material with high thermal conductivity such as aluminum nitride. Making the base 30 from a material having high thermal conductivity makes it possible to sufficiently heat the fixing belt 20 even if the resistive heat generator 31 is disposed on the side of the base 30 opposite to the fixing belt 20 side.

The heater holder 23 and the stay 24 are arranged on the inner circumferential side of the fixing belt 20. The stay 24 is configured by a channeled metallic member, and both side plates of the fixing device 9 support both end portions of the stay 24 in the longitudinal direction of the stay 24. Because the stay 24 supports the heater holder 23 and the heater 22, the heater 22 reliably receives a pressing force of the pressure roller 21 in a state where the pressure roller 21 is pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

The stay 24 has a substantially U-shaped structure including right-angle portions 24*a* constituting side walls on an upstream side and a downstream side wall, respectively, in the sheet conveyance direction of the stay. The right-angle portions 24*a* are in contact, via the end surfaces thereof, with the heater holder 23 and which support the heater holder 23. The right-angle portions 24*a* extend in a left-right direction in FIG. 2, which is the pressing direction of the pressure roller 21. The stay 24 is grounded via a resistor 41.

The stay 24 according to the present embodiment has portions extending in the pressing direction (the left-right direction in FIG. 2) of the pressure roller 21, or thick portions, which are brought into contact with the heater holder 23 from the side opposite to the side of the pressure roller 21 (the left side of FIG. 2), to support the heater holder 23. Such a configuration suppresses bending (in the present embodiment, longitudinal bending in particular) of the heater holder 23, which is caused by the pressing force from the pressure roller 21. However, the above-described contact between the stay 24 and the heater holder 23 includes not only a case where the stay 24 is in direct contact with the heater holder 23 but also a case where the stay 24 contacts the heater holder 23 via another member. The wording "contacts the heater holder 23 via another member" means a state where another member is interposed between the stay 24 and the heater holder 23 in the left-right direction in FIG. 2, and in a position of at least partial correspondence, the stay 24 contacts the member and the other member contacts the heater holder 23. The wording "extending in the pressing direction" above is not limited to a direction which is the same as the pressing direction of the pressure roller 21, but rather includes a case of extension in a direction at a certain angle from the pressing direction of the pressure roller 21. Even in such cases, the stay 24 is naturally capable of reducing the bending of the heater holder 23 under the pressing force from the pressure roller 21.

The heater holder 23 is heated to a high temperature by the heat from the heater 22, and therefore is preferably made of a heat resistant material. For example, in a case where the heater holder 23 is made of a heat-resistant resin having low thermal conduction such as a liquid crystal polymer (LCP) or PEEK, heat transfer from the heater 22 to the heater holder 23 is suppressed. Thus, the heater 22 is capable of heating the fixing belt 20 effectively.

Figure 20:
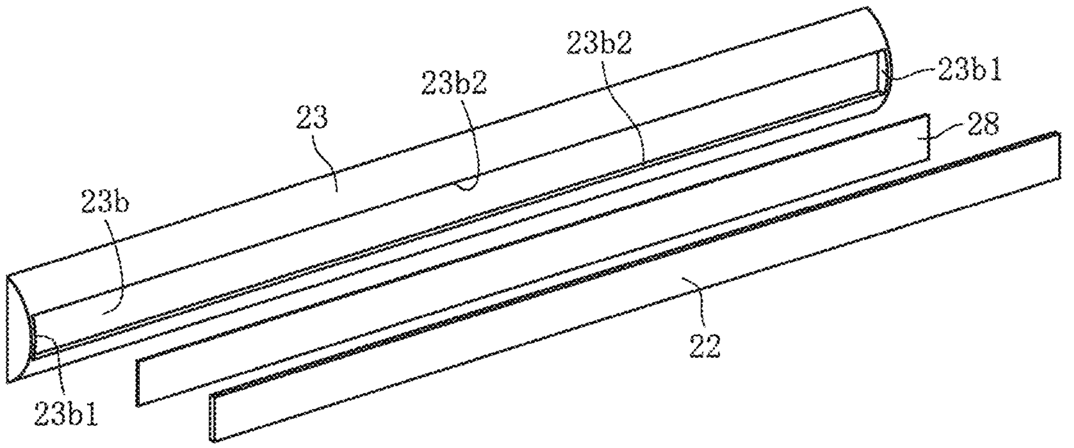
FIG. 20 is a perspective view of the heater, a first high thermal conductor, and a heater holder.

The heater holder 23 has a concave portion 23*b* for holding the first high thermal conductor 28 and the heater 22 (see FIG. 20).

As illustrated in FIG. 2, the heater holder 23 integrally includes a guide portion 26 for guiding the fixing belt 20. The guide portion 26 is provided upstream and downstream, respectively, from the heater holder 23 in the sheet conveyance direction.

The guide portion 26 includes a plurality of guide ribs 260 as guides. Each guide rib 260 is substantially fan-shaped. The guide ribs 260 have a guide surface 260*a* that is arc-shaped or shaped as a convex curved surface extending in a belt circumferential direction and provided along the inner circumferential surface of the fixing belt 20.

The heater holder 23 has an opening 23*a* penetrating the heater holder in the thickness direction thereof. The thermistor 25 and a thermostat which is described below are provided in the opening 23*a*. Springs apply pressure to the thermistor 25 and the thermostat, thus pushing same against the back surface of the first high thermal conductor 28. However, the first high thermal conductor 28 and a second high thermal conductor described below may also be similarly provided with an opening such that the thermistor 25 and the thermostat are pushed against the back surface of the base 30.

The first high thermal conductor 28 is made of a material having a thermal conductivity higher than the thermal conductivity of the base 30. In the present embodiment, the first high thermal conductor 28 is formed of plate-shaped aluminum. Alternatively, the first high thermal conductor 28 may be made of copper, silver, graphene, or graphite, for example. Making the first high thermal conductor 28 plate-shaped enables an improvement in the positional accuracy of the heater 22 relative to the heater holder 23 and the first high thermal conductor 28.

Next, a method for calculating the thermal conductivity will be described. In calculating thermal conductivity, the thermal diffusivity of an object to be measured is first measured, whereupon the thermal conductivity is calculated using the thermal diffusivity.

Thermal diffusivity is measured using a thermal diffusivity-and-conductivity measuring device (product name: ai-Phase Mobile 1u, manufactured by ai-Phase Co., Ltd.).

In order to convert the thermal diffusivity into thermal conductivity, values for the density and specific heat capacity are required. The density is measured using a dry automatic densitometer (product name: Accupyc 1330 manufactured by Shimadzu Corporation). The specific heat capacity is measured using a differential scanning calorimeter (product name: DSC-60 manufactured by Shimadzu Corporation), and sapphire is used as a reference material of a known specific heat capacity. According to the present embodiment, the specific heat capacity is measured five times, and an average value at 50° C. is used. The thermal conductivity λ can be obtained by means of the following formula (1), where ρ is the density, C is the specific heat capacity, and a is the thermal diffusivity obtained by the thermal diffusivity measurement described above.

$$\lambda=\rho\times C\times\alpha \quad (1)$$

When the fixing device 9 according to the present embodiment starts the print operation, the pressure roller 21 is driven to rotate, and the fixing belt 20 starts to be driven to rotate. At such time, the guide surface 260*a* of the guide rib 260 contacts and guides the inner circumferential surface of the fixing belt 20 to stably and smoothly rotate the fixing belt 20. Power is supplied to the resistive heat generator 31 of the heater 22, thereby heating the fixing belt 20. Further, when the temperature of the fixing belt 20 reaches a fixing temperature, which is a predetermined target temperature, the sheet P bearing an unfixed toner image is conveyed to the fixing nip N between the fixing belt 20 and the pressure roller 21, as illustrated in FIG. 2, and the unfixed toner image is heated and pressed so as to be fixed to the sheet P.

Figure 3:
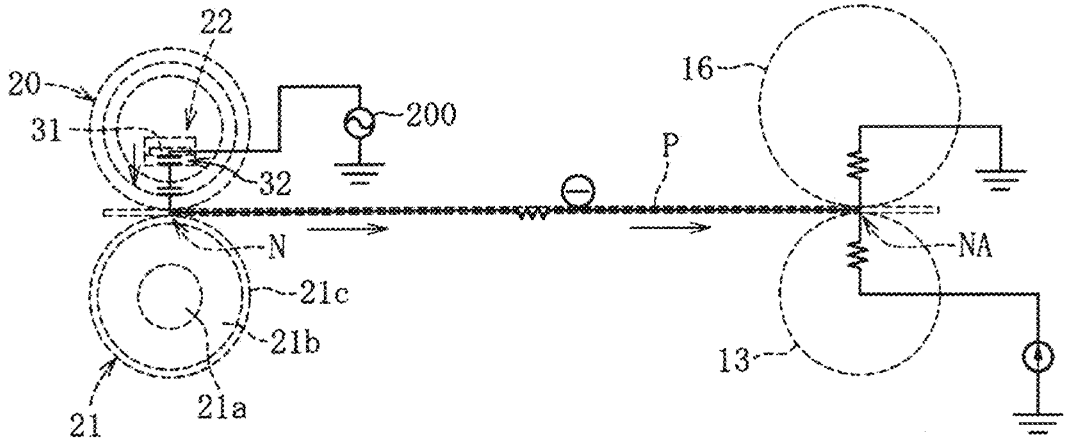
FIG. 3 is a diagram to illustrate the formation of banding artifacts.

Incidentally, such a fixing device 9 is disadvantageous with regard to banding artifacts. That is, in the fixing device 9, in which an AC voltage is applied to the heater 22, the insulation layer provided to the heater 22 and the surface layer of the fixing belt 20 are equivalent to parts of a capacitor. At such time, when the heater 22 and the fixing belt 20 are in contact with one another, the AC voltage is applied to the fixing nip N via the fixing belt 20. As illustrated in FIG. 3, in a state where the sheet P is in contact with both a secondary transfer nip NA and the fixing nip N, the AC voltage is transmitted to the secondary transfer nip NA via the sheet P, as indicated by the arrow in FIG. 3. The AC voltage affects the transfer electric field to cause periodic density unevenness in the transferred image, that is, so-called banding artifacts. In particular, in a case where the sheet P has low resistance, for example, in a high-humidity environment or when a thin paper sheet is used as the sheet P, the above-described disadvantage is likely to occur. The secondary transfer nip NA is a nip portion formed between the secondary transfer roller 13 and a secondary-transfer opposing roller 16.

Further, image defects caused by an electrostatic offset are sometimes generated by this kind of fixing device 9. That is, upon passing through the fixing nip N, the surface layer of the fixing belt 20, which has been electrically charged, attracts unfixed toner on the sheet P, and the unfixed toner on the sheet P adheres to the fixing belt 20. Thereafter, under the rotation of the fixing belt 20, the toner adhering thereto moves once again toward the fixing nip N, and the toner adheres to the sheet P that reaches the fixing nip N after the aforementioned sheet. The adhesion of the toner causes image defects.

Therefore, in the present embodiment, the fixing device 9 includes the above-described conductor 40, thereby enabling an alternating current to be passed from the fixing nip N to the ground via the fixing belt 20 and then the conductor 40. Thus, the formation of the above-described banding artifacts is suppressed. Further, by providing the conductor 40, the charge on the surface of the fixing belt 20 is removed, thereby suppressing the aforementioned image defects caused by an electrostatic offset. The conductor is also referred to as a destaticizer.

The conductor 40 is sheet-shaped and flexible. The conductor 40 is made of a conductive material, and in the present embodiment, is made of a conductive polyimide to which carbon black has been added. The conductor 40 is grounded via the stay 24 and the resistor 41. Due to this configuration, an electrical path for establishing an electrical connection from the conductor 40 to the frame ground is formed. A plurality of conductors 40, or one conductor 40, may be arranged in the longitudinal direction. At least a portion of the conductor 40 is preferably disposed between the stay 24 and the guide portion 26.

The conductor 40 has one end 40*a* which is a free end and which is a contact portion that contacts the inner surface of the fixing belt 20. The contact of the one end 40*a* with the inner surface of the fixing belt 20 enables the charge on the fixing belt 20 to pass to the ground through the stay 24 and the resistor 41, thus removing the charge that has accumulated on the surface of the fixing belt 20. In the present embodiment, an other end 40*b* of the conductor 40 is on the opposite side to the one end 40*a*. The one end 40*a* side or the other end 40*b* side simply refers to being closer to the one end 40*a* or the other end 40*b* relative to a center position of the length along the direction orthogonal to the width direction, in the direction along the surface of the conductor 40. In other words, in cases where the conductor 40 is not bent and has a substantially sheet-like form, closer to the one end 40*a* or the other end 40*b* than a position corresponding to the center position in the direction orthogonal to the width direction, in the direction along the surface of the conductor 40.

The conductor 40 may have a shape having a pointed end on the one end 40*a* side, or may have a rectangular shape. Various shape examples of the conductor 40 will be described below with reference to FIGS. 5A to 11D. First, a basic shape, arrangement, and the like of the conductor 40 will be described with reference to FIG. 2.

As illustrated in FIG. 2, the conductor 40 has an opposing portion 40*c* opposing a first opposing surface 24*d* of the stay 24 and opposing a second opposing surface 26*a* of the guide portion 26. The first opposing surface 24*d* and the second opposing surface 26*a* regulate the inclination of the conductor 40. That is, the first opposing surface 24*d* and the second opposing surface 26*a* are arranged in positions so as to come into contact with the conductor 40 when the conductor 40 is inclined in an upward direction and a downward direction, respectively, in FIG. 2, thus enabling the inclination of the conductor 40 to be regulated.

The opposing portion 40*c* faces the first opposing surface 24*d* and the second opposing surface 26*a* and extends along the first opposing surface 24*d* and the second opposing surface 26*a*. However, the opposing portion 40*c* does not necessarily have to be disposed along both the first opposing surface 24*d* and the second opposing surface 26*a*. The first opposing surface 24*d* and the second opposing surface 26*a* according to the present embodiment are planar portions extending in a direction substantially parallel to the pressing direction of the pressure roller 21.

The guide portion 26 is a second opposing member according to the present embodiment. The second opposing member may be formed integrally with the heater holder 23 as per the present embodiment or may be an independent member. The second opposing member is not limited to a member having the guide surface 260*a* that guides the inner surface of the fixing belt 20 as per the present embodiment.

The conductor 40 has one end bent portion 40*d* that is adjacent to the opposing portion 40*c* and that is bent toward a first surface 401 which lies opposite a second surface 402 in contact with the conductor 40. The one end bent portion 40*d* is a portion bent using elastic deformation. In the conductor 40 according to the present embodiment, a portion extending from the one end bent portion 40*d* to the one end 40*a* is bent toward downstream of the fixing belt 20 in the rotation direction.

Further, the other end 40*b* side of the conductor 40 is bent from the opposing portion 40*c*. A portion of the conductor 40, which is on the other end 40*b* side on the opposite side to the one end 40*a*, the opposing portion 40*c* being interposed between the one end 40*a* and the other end 40*b*, is sandwiched between a right-angle portion 24*a* of the stay 24 and the heater holder 23, in the left-right direction of FIG. 2. As a result, due to the pressing force of the pressure roller 21, the conductor 40 is reliably sandwiched between the stay 24 and the heater holder 23. The above-described configuration enables the other end 40*b* of the conductor 40 to be positioned with respect to the stay 24. The conductor 40 can also be reliably brought into contact with the stay 24 and grounded via the stay 24, thus enabling the conductor 40 to be held by the stay 24 and the heater holder 23. In addition, such advantageous effects can be obtained without providing fasteners such as screws, thereby enabling a more compact fixing device. Reducing the thermal capacity of the fixing device also enables energy savings.

Stabilizing the contact state of the conductor 40 with the inner surface of the fixing belt 20 enables the alternating current applied to the fixing nip N to stably pass to the ground via the fixing belt 20.

Furthermore, in the present embodiment, the one end 40*a*, which is the contact portion of the conductor 40, comes into contact with the fixing belt 20 in a position beyond the first opposing surface 24*d* of the stay 24. In other words, the one end 40*a* of the conductor 40 is disposed on the side opposite to the opposing portion 40*c* such that the first opposing surface 24*d* is sandwiched between the one end 40*a* and the opposing portion 40*c*. The above wording "on the side opposite to the opposing portion 40*c* such that the first opposing surface 24*d* is sandwiched between the one end 40*a* and the opposing portion 40*c*" means that, when an extended surface L (see FIG. 2) obtained by extending the first opposing surface 24*d* is taken as a boundary, the one end 40*a* is disposed on one side of the boundary while the opposing portion 40*c* is on the other side of the boundary. The "first opposing surface" in the wording "on the side opposite to the opposing portion 40*c* such that the first opposing surface 24*d* is sandwiched between the one end 40*a* and the opposing portion 40*c*" is a surface facing a portion of the conductor 40 opposite to the one end 40*a* with the one end bent portion 40*d* sandwiched therebetween, and in the present embodiment in particular, is a surface facing the opposing portion 40*c* including a portion adjacent to the one end bent portion 40*d*. The above-described configuration ensures a contact pressure of the conductor 40 against the inner surface of the fixing belt 20, thus enabling stabilization of the contact state of the conductor 40 with the inner surface of the fixing belt 20.

According to the present embodiment in particular, part of the conductor 40 comes into contact with the stay 24 such that a portion closer to the one end 40*a* than the contact portion is bent toward the downstream side in the rotation direction of the fixing belt 20. That is, the conductor 40 is in contact with the stay 24 and is thus supported by the stay 24 from the opposite side to the rotation direction J of the fixing belt 20. A portion of the conductor 40 closer to the one end 40*a* than the contact portion or a portion of the conductor 40 closer to the one end 40*a* including the contact portion is bent toward the downstream side in the rotation direction J. Bending the portion of the conductor 40 in contact with the inner surface of the fixing belt 20 in this manner ensures the contact pressure of the conductor 40 against the inner surface of the fixing belt 20 as described above, thus enabling stabilization of the contact state.

Note that part of the conductor according to the present embodiment being "disposed along" the first opposing surface or the second opposing surface is not limited to a case where the part of the conductor lies completely parallel to the first opposing surface or the second opposing surface, and may include a case where the part of the conductor is slightly inclined. That is, it is sufficient that the first opposing surface or the second opposing surface makes it possible to regulate the shape of the opposing portion of the conductor to stabilize the contact position and the contact posture of the conductor with respect to the fixing rotator. In addition, being "disposed along" refers to a case where the conductor is disposed close to the first opposing surface or the second opposing surface and obviously does not include a case where the conductor is disposed in a position separate from the first opposing surface or the second opposing surface so as not to come into contact with the first opposing surface or the second opposing surface even when the conductor is inclined, for example.

Furthermore, in the present embodiment, a case is presented where the conductor 40 is disposed between the stay 24 and the downstream guide rib 260, but the conductor 40 may be disposed between the stay 24 and the upstream guide rib 260. In this case, the opposing portion 40*c* of the conductor 40 faces the first opposing surface of the upstream guide rib 260, which constitutes a first opposing member, and the second opposing surface of the stay 24, which constitutes a second opposing member.

In a case where the fixing belt 20 includes a non-conductive elastic layer, the elastic layer also serves as a capacitor like the insulation layer of the heater 22, and the above-described banding artifacts are likely to occur. Thus, not including a non-conductive elastic layer in the fixing belt 20 makes it possible to suppress the disadvantage of banding artifacts.

Figure 4A:
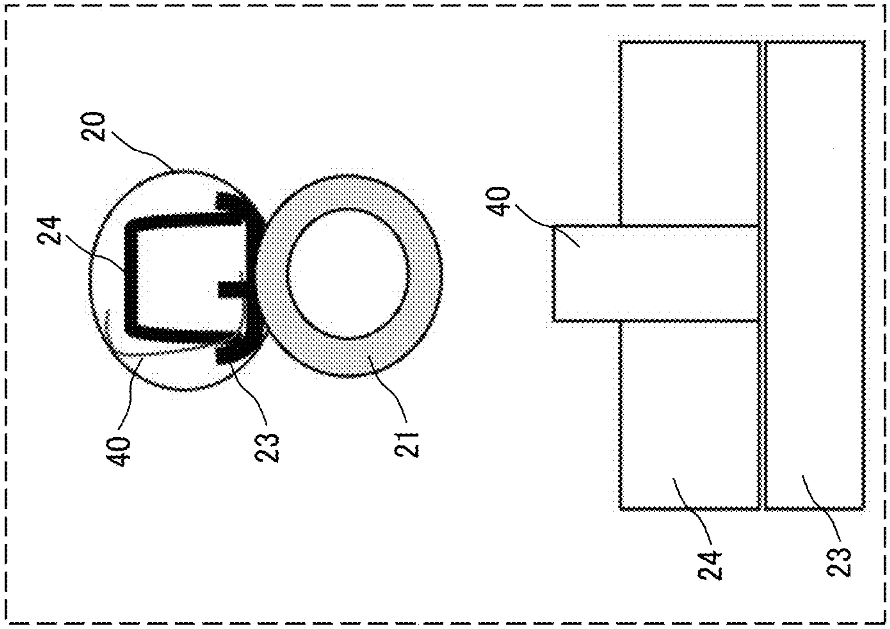
Figure 4B:
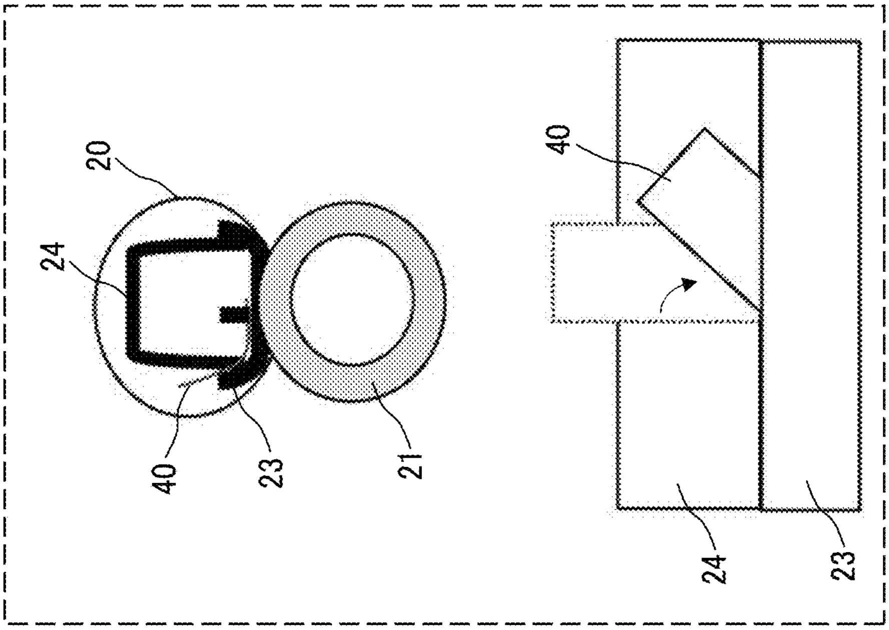

Incidentally, the conductor 40 described above sometimes cannot be fixed well due to movement of the member at the time of attachment. For example, as illustrated in FIGS. 4A and 4B, the conductor 40 rotates, and one end 40*a* thereof does not come into contact with the inner surface of the fixing belt 20, and thus destaticization of the fixing belt 20 cannot be performed. FIGS. 4A and 4B are schematic diagrams illustrating examples of a contact state between the conductor 40 and the fixing belt 20. FIG. 4A illustrates an example of a state in which the conductor 40 is in a normal position and the conductor 40 and the fixing belt 20 are in contact with each other. FIG. 4B illustrates an example of a state in which the conductor 40 is in an inclined position and the conductor 40 and the fixing belt 20 are not in contact with each other.

Further, when the conductor 40 is assembled, it is necessary to return the conductor 40 to a correct position or assemble the stay 24 to prevent rotation, and hence there is the disadvantage that assembly workability of the fixing device 9 deteriorates.

In order to solve such disadvantages, in the fixing device 9 according to the present embodiment, as a structure for attaching the conductor 40 to the fixing device 9, the stay 24, which serves as a support, is provided with a rotation-regulating shape of regulating rotation of the conductor 40. In this way, rotation of the conductor can be prevented. In addition, by providing the stay 24 with a rotation-regulating shape without separately providing a whirl-stop member, there is a reduction in the number of parts, and the number of assembly steps is reduced, thus affording reduced costs. In addition, by providing a rotation stopper on the stay 24 of the heater holder 23 that guides the fixing belt 20, the positional accuracy between the fixing belt 20 and the conductor 40 can be enhanced. In addition, it is possible to facilitate assembly when the conductor is attached to the support.

Further, the rotation-regulating shape may be provided at two or more points. In this way, the rotation of the conductor can be more reliably prevented.

Next, specific examples of rotation-regulating shapes will be described in detail with reference to FIGS. 5A to 11D.

The shape example described below shows a state in which one conductor 40 is attached in an arbitrary position of the stay 24, but in a case where a plurality of conductors 40 is attached, the stay 24 is provided with a rotation-regulating shape corresponding to the number of conductors 40.

First, an example in which the stay 24 is provided with a convex shape as the rotation-regulating shape will be described.

Figure 5A:
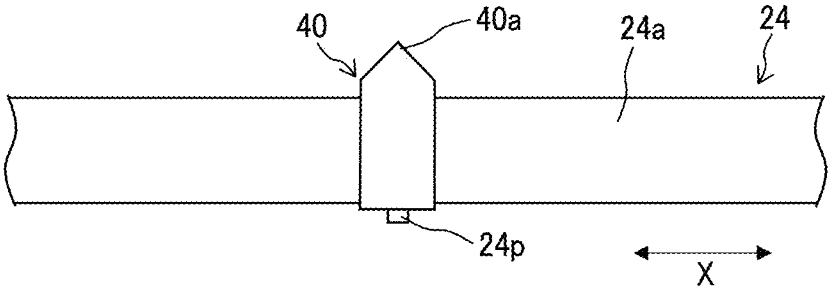
FIGS. 5A to 5D are diagrams illustrating an example of attachment of a stay and a conductor when the stay is provided with a convex shape as a rotation-regulating shape.
Figure 5B:
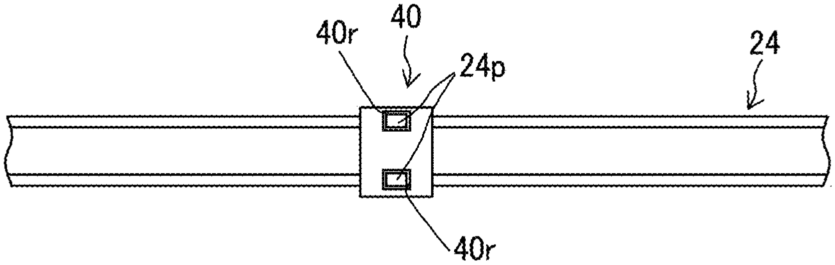
Figure 5C:
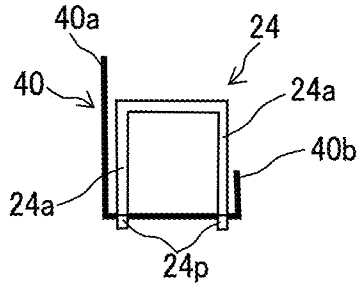
Figure 5D:
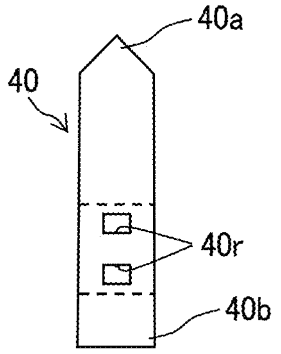

FIGS. 5A to 5D are diagrams illustrating an example of attachment of the stay and the conductor when the stay is provided with a convex shape. Among FIGS. 5A to 5D, FIG. 5A illustrates an example of a state of a front surface, FIG. 5B illustrates an example of a state of a bottom surface, FIG. 5C illustrates an example of a state of a right side surface, and FIG. 5D illustrates an example of a shape of the conductor, where the front surface is a surface of the stay 24 along the longitudinal direction (the direction of double-headed arrow X) on the side where the conductor 40 is attached to the right-angle portion 24*a* of the stay 24 (see FIG. 2). Hereinafter, similarly in FIGS. 6A to 11D, a surface of the stay 24 along the longitudinal direction on which the conductor 40 is attached to the right-angle portion 24*a* of the stay 24 is defined as the front surface.

Furthermore, in FIGS. 5A to 11D, a broken line in the shape example of the conductor 40 indicates a bending position when the conductor 40 attached to the stay 24.

In FIGS. 5A to 5D, the stay 24 has two convex shapes (convex portions) 24*p* serving as rotation-regulating shapes. The stay 24 is provided with a convex shape 24*p* at each end portion on the bottom surface side of the stay 24.

The conductor 40 has two holes 40*r* that can be laid in the convex shape 24*p*. The conductor 40 has a shape attached from one right-angle portion 24*a* side of the stay 24 to the other right-angle portion 24*a* side through the bottom surface, and is fixed by inserting the convex shape 24*p* into the holes 40*r*.

As described above, the rotation of the conductor 40 can be prevented by using the convex shape 24*p* as the rotation-regulating shape of the stay 24 and providing the hole 40*r* in the corresponding conductor 40.

Second, an example in which the stay 24 is provided with a concave shape as the rotation-regulating shape will be described.

FIGS. 6A to 6D are diagrams illustrating an example of attachment of the stay and the conductor when the stay is provided with a concave shape, and FIGS. 7A to 8D illustrate modified examples.

Figure 6A:
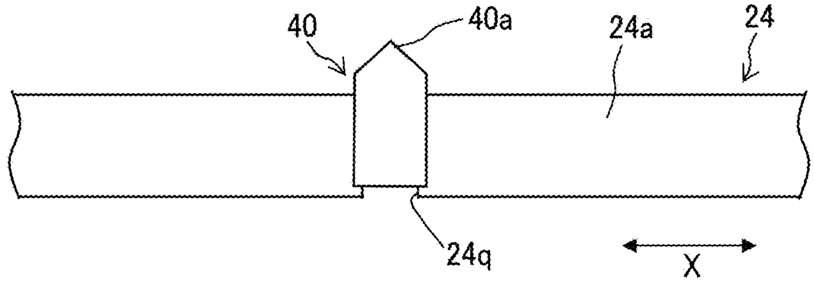
FIGS. 6A to 6D are diagrams illustrating an example of attachment of the stay and the conductor when the stay is provided with a concave shape as a rotation-regulating shape.
Figure 6B:
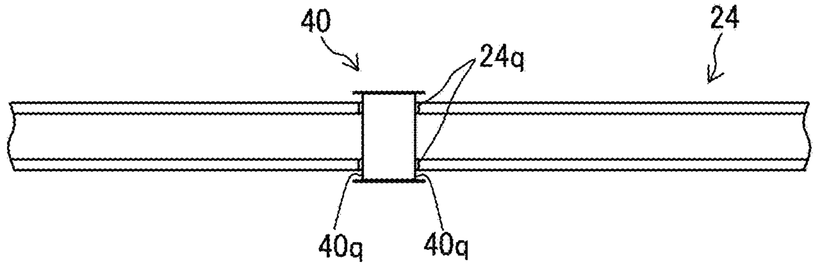
Figure 6C:
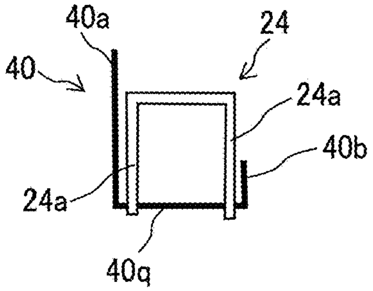
Figure 6D:
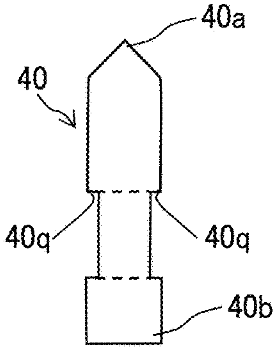
Figure 7A:
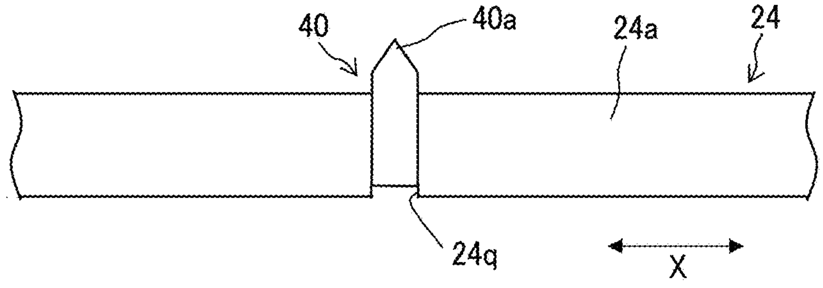
FIGS. 7A to 7D are diagrams illustrating another example of attachment of the stay and the conductor when the stay is provided with a concave shape as a rotation-regulating shape.
Figure 7B:
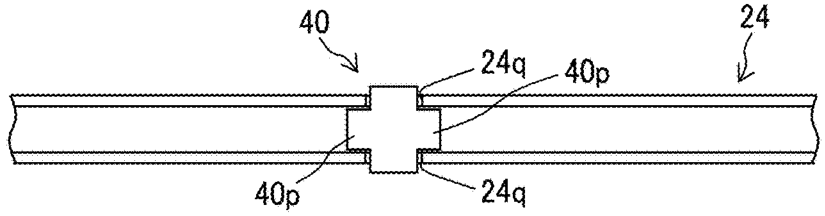
Figure 7C:
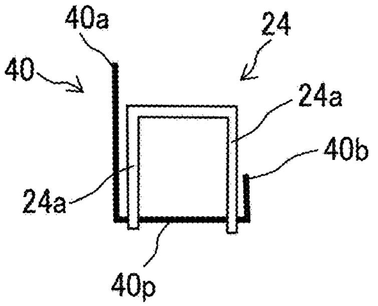
Figure 7D:
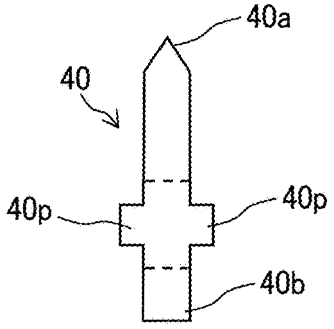
Figure 8A:
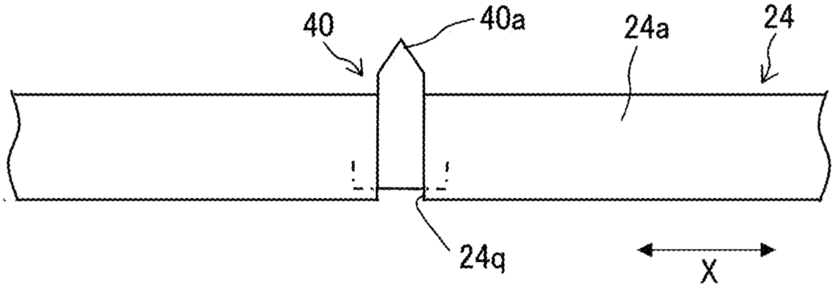
FIGS. 8A to 8D are diagrams illustrating yet another example of attachment of the stay and the conductor when the stay is provided with a concave shape as a rotation-regulating shape.
Figure 8B:
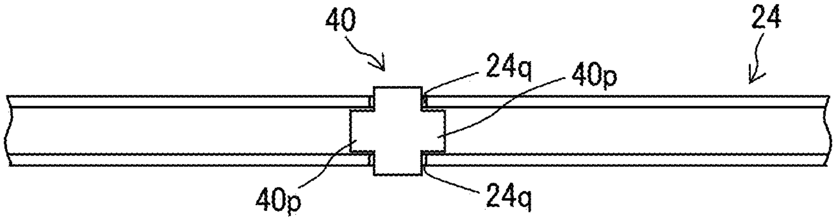
Figure 8C:
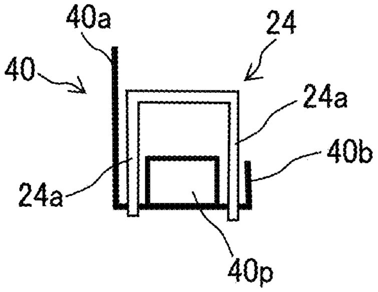
Figure 8D:
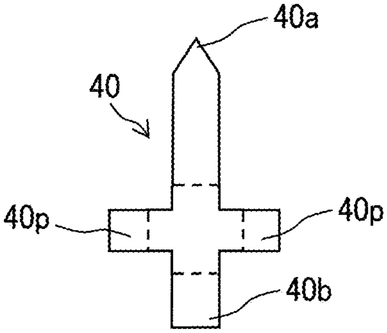

Among FIGS. 6A to 8D, FIGS. 6A, 7A and 8A illustrate an example of a state of a front surface, FIGS. 6B, 7B and 8B illustrate an example of a state of a bottom surface, FIGS. 6C, 7C and 8C illustrate an example of a state of a right side surface, and FIGS. 6D, 7D and 8D illustrate an example of a shape of a conductor.

In FIGS. 6A to 6D, the stay 24 has two concave shapes (concave portions) 24*q* serving as rotation-regulating shapes. The stay 24 is provided with the concave shapes 24*q* along the longitudinal direction at each end portion on the bottom surface side of the stay 24.

The conductor 40 has a shape attached from one right-angle portion 24*a* of the stay 24 to the other right-angle portion 24*a* through the bottom surface. The conductor 40 has a shape in which the size (width) of the portion to be attached by passing between the two concave shapes 24*q* of the stay 24 on the bottom surface is made smaller than the one end 40*a* side and the other end 40*b* side of the conductor 40, and has a size that can be attached according to the size (length) of the concave shapes 24*q* of the stay 24. In the example of FIGS. 6A to 6D, the conductor 40 is provided with two concave shapes 40*q*. The conductor 40 is fixed by arranging the concave shapes 40*q* in the concave shapes 24*q*.

FIGS. 7A to 7D illustrate an example in which the rotation-regulating shape of the stay 24 is similar to that in FIGS. 6A to 6D, and the shape of the conductor 40 is different from that in FIGS. 6A to 6D.

The conductor 40 has a shape in which a size (width) of a portion disposed between two concave shapes 24*q* of the stay 24 (hereinafter also referred to as the "portion sandwiched between the concave shapes of the stay") is larger than the one end 40*a* side and the other end 40*b* side of the conductor 40 and is larger than the size (length) of the concave shape 24*q* along the longitudinal direction, which is a shape such that the portion is not moved in a direction toward the one end 40*a* side or the other end 40*b* side of the conductor 40 when the portion is disposed between the concave shapes 24*q*. In the example of FIGS. 7A to 7D, the conductor 40 is provided with two convex shapes 40*p*. The conductor 40 is fixed by arranging the convex shape 40*p* between the two concave shapes 24*q* of the stay 24.

FIGS. 8A to 8D illustrate an example in which the rotation-regulating shape of the stay 24 is similar to that in FIGS. 6A to 6D, and the shape of the conductor 40 is different from those in FIGS. 6A to 7D.

The conductor 40 has a shape in which the portion sandwiched between the concave shapes of the stay described above is larger than the one end 40*a* side and the other end 40*b* side of the conductor 40 and is larger than the length of the concave shapes 24*q* along the longitudinal direction, as per FIGS. 7A to 7D. In the example of FIGS. 8A to 8D, the conductor 40 is provided with two convex shapes 40*p*, and a portion of the convex shapes 40*p* is bent in the direction toward the one end 40*a* of the conductor 40. In FIG. 8A, an example of a state in which the convex shapes 40*p* of the conductor 40 are bent is indicated by a dotted broken line. The conductor 40 is fixed by arranging the portion sandwiched between the concave shapes of the stay between the two concave shapes 24*q* of the stay 24, and the rotation of the conductor 40 can be more reliably regulated in comparison with the attachment example of FIGS. 7A to 7D.

As described above, the rotation-regulating shapes of the stay 24 are the concave shapes 24*q*, and the conductor 40 is disposed in the concave shapes 24*q*, thereby preventing rotation of the conductor 40.

Third, an example in which a hole is provided in the stay 24 will be described as the rotation-regulating shape.

Figure 9A:
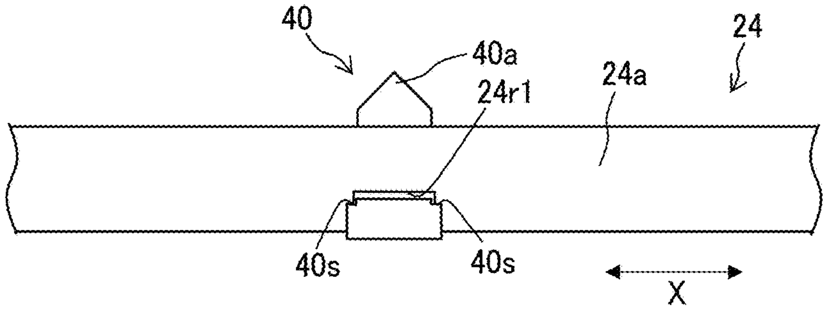
FIGS. 9A to 9E are diagrams illustrating an example of attachment of the stay and the conductor when the stay is provided with a hole as a rotation-regulating shape.
Figure 9B:
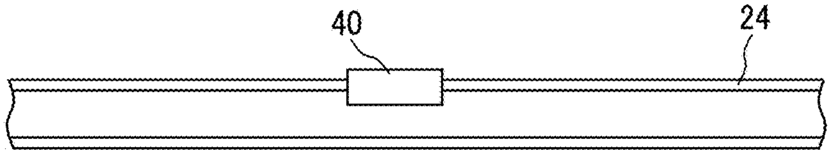
Figure 9C:
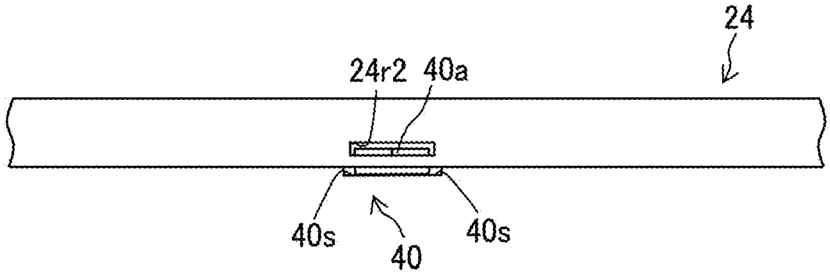
Figure 9D:
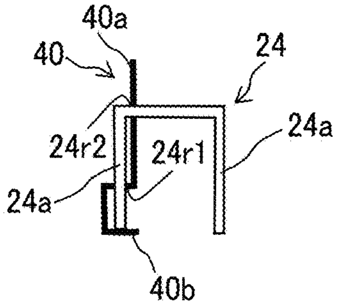
Figure 9E:
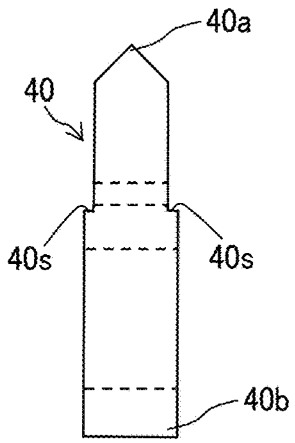

FIGS. 9A to 9E are diagrams illustrating an example of attachment of the stay and the conductor when the stay is provided with a hole. Among FIGS. 9A to 9E, FIG. 9A illustrates an example of a state of a front surface, FIG. 9B illustrates an example of a state of a bottom surface, FIG. 9C illustrates an example of a state of an upper surface, FIG. 9D illustrates an example of a state of a right side surface, and FIG. 9E illustrates an example of a shape of a conductor.

In FIGS. 9A to 9E, the stay 24 has two holes as rotation-regulating shapes, and a hole 24*r*1 is provided in the right-angle portion 24*a* and a hole 24*r*2 is provided on the upper surface side.

The other end 40*b* side of the conductor 40 is disposed on the bottom surface, the one end 40*a* side of the conductor 40 is inserted into the hole 24*r*1, and further inserted into the hole 24*r*2 on the upper surface side of the stay 24.

The conductor 40 has a shape in which the size (width) of the portion to be inserted into the holes 24*r*1 and 24*r*2 is made smaller than that of the other portion, and a step, a concave shape (recess), or the like is provided so that the other portion cannot be inserted into the hole 24*r*1. In the example of FIGS. 9A to 9E, two steps 40*s* are provided to reduce the size of the portion to be inserted. Due to this configuration, the range within which insertion into hole 24*r*1 is possible is limited. The conductor 40 is fixed by inserting the one end 40*a* side of the conductor 40 into the holes 24*r*1 and 24*r*2.

As described above, the rotation of the conductor 40 can be prevented by using the holes 24*r*1 and 24*r*2 as the rotation-regulating shapes of the stay 24 and passing the conductor 40 through the holes.

Fourth, an example in which the stay 24 is provided with two or more of a convex shape, a concave shape, or a hole in combination as the rotation-regulating shapes will be described.

Figure 10A:
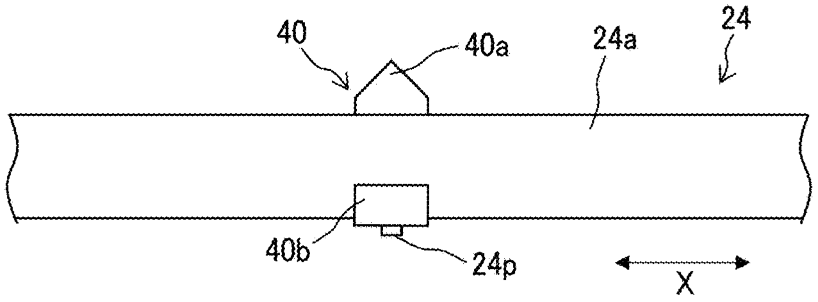
FIGS. 10A to 10E are diagrams illustrating an example of attachment of the stay and the conductor when the stay is provided with a convex shape and a hole as rotation-regulating shapes.
Figure 10B:
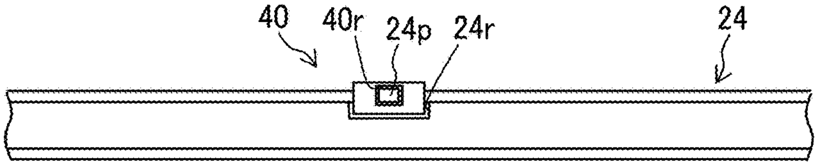
Figure 10C:
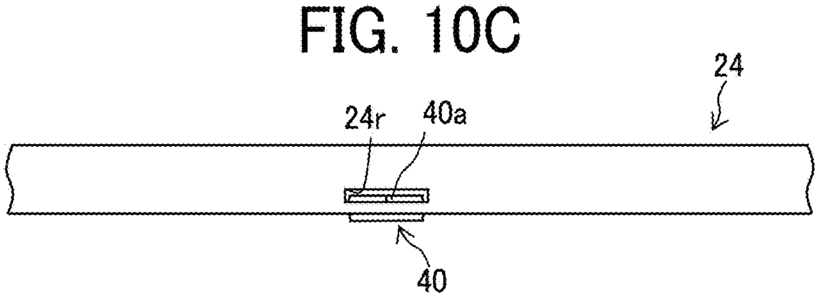
Figure 10D:
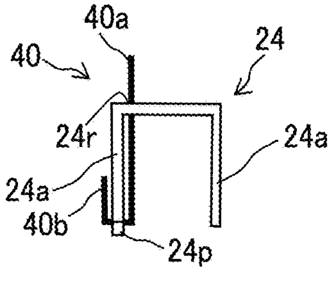
Figure 10E:
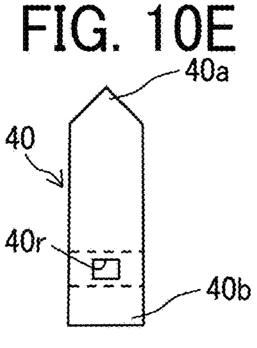

FIGS. 10A to 10E are diagrams illustrating an example of attachment of the stay and the conductor when the stay is provided with a convex shape and a hole. Among FIGS. 10A to 10E, FIG. 10A illustrates an example of a state of a front surface, FIG. 10B illustrates an example of a state of a bottom surface, FIG. 10C illustrates an example of a state of an upper surface, FIG. 10D illustrates an example of a state of a right side surface, and FIG. 10E illustrates an example of a shape of a conductor.

Figure 11A:
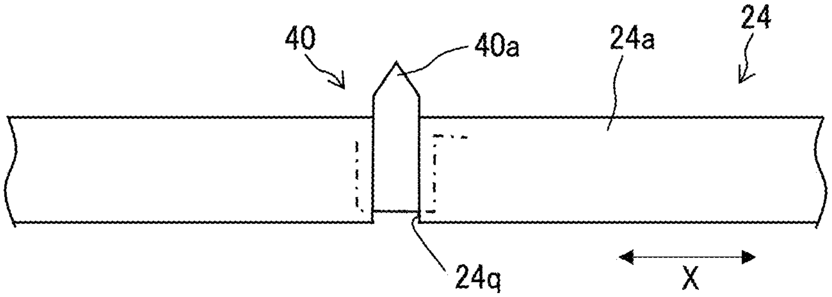
FIGS. 11A to 11D are diagrams illustrating an example of attachment of the stay and the conductor when the stay is provided with a convex shape and a concave shape as rotation-regulating shapes.
Figure 11B:
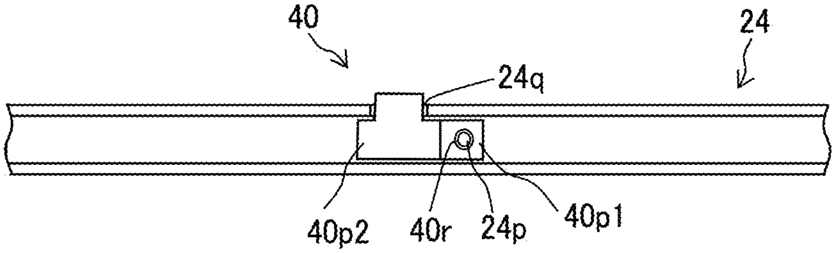
Figure 11C:
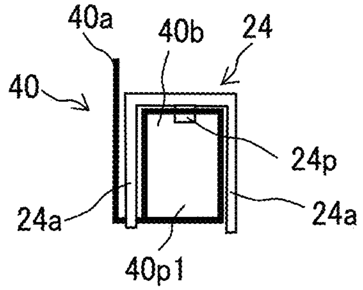
Figure 11D:
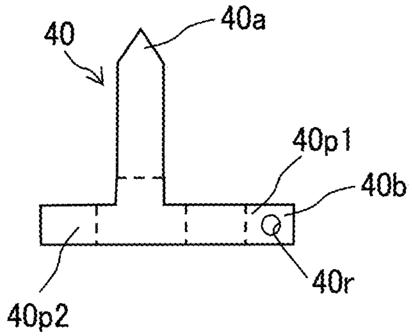

FIGS. 11A to 11D are diagrams illustrating an example of attachment of the stay and the conductor when the stay is provided with a convex shape and a concave shape. Among FIGS. 11A to 11D, FIG. 11A illustrates an example of a state of a front surface, FIG. 11B illustrates an example of a state of a bottom surface, FIG. 11C illustrates an example of a state of a right side surface, and FIG. 11D illustrates an example of a shape of a conductor.

In FIGS. 10A to 10E, as the rotation-regulating shapes of the stay 24, a convex shape 24*p* is provided at one of the end portions on the bottom surface side of the stay 24, and a hole 24*r* is provided on the upper surface side.

The conductor 40 has a hole 40*r* that can be laid in the convex shape 24*p*. The conductor 40 is fixed by inlaying the hole 40*r* in the convex shape 24*p* and inserting the one end 40*a* side of the conductor 40 into the hole 24*r* after passing between the two right-angle portions 24*a* of the stay 24, to protrude from the upper surface of the stay 24.

In FIGS. 11A to 11D, as the rotation-regulating shapes of the stay 24, a concave shape 24*q* is provided at one end portion on the bottom surface side of the stay 24, and a convex shape 24*p* protruding toward the bottom surface is provided on the upper surface side.

The conductor 40 has a hole 40*r* that can be laid in the convex shape 24*p*. In addition, the conductor 40 has a shape in which a portion disposed between the two right-angle portions 24*a* of the stay 24 is larger in size (width) than the one end 40*a* side of the conductor 40 and is larger in size (length) than the concave shapes 24*q* along the longitudinal direction. In the example of FIGS. 11A to 11D, the conductor 40 is provided with two convex shapes 40*p*1 and 40*p*2, and a portion of the convex shapes 40*p*1 and 40*p*2 is bent in the direction toward the one end 40*a* of the conductor 40. Further, the one convex shape 40*p*1 is bent along the upper surface of the stay 24, and the hole 40*r* is laid in the convex shape 24*p*. In FIG. 11A, an example of a state in which the convex shapes 40*p*1 and 40*p*2 of the conductor 40 are bent is indicated by a dotted broken line. Due to this configuration, the conductor 40 is fixed. Note that, in FIGS. 11A to 11D, the conductor 40 has a plurality of end portions, and the end portion farthest from the one end 40*a* side of the conductor 40 is illustrated as the other end 40*b* side of the conductor 40.

As described above, the rotation of the conductor 40 can be prevented by using a concave shape, a convex shape, or a combination of holes as the rotation-regulating shapes of the stay 24.

Figure 12:
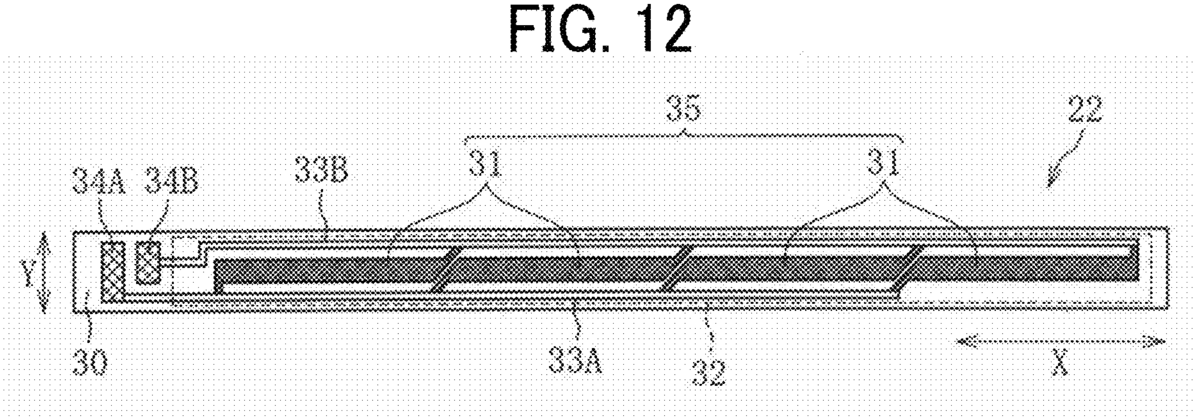
FIG. 12 is a plan view of a heater.

Next, a more detailed configuration of the heater provided to the above-described fixing device is described with reference to FIG. 12. FIG. 12 is a plan view of the heater according to the present embodiment.

As illustrated in FIG. 12, provided on the surface of the plate-shaped base 30 are a plurality of (four) resistive heat generators 31, power supply lines 33A and 33B serving as conductors, a first electrode 34A, and a second electrode 34B. However, the number of resistive heat generators 31 is not limited to the number in the present embodiment. Hereinafter, the power supply lines 33A and 33B are also referred to as the power supply lines 33, and the first electrode 34A or the second electrode 34B is also referred to as the electrode 34.

Note that, according to the present embodiment, the longitudinal direction of the heater 22 and the like, which is the direction perpendicular to the surface of the paper on which FIG. 2 is drawn, is also an arrangement direction X in which the plurality of resistive heat generators 31 are arranged, as illustrated in FIG. 12. Hereinafter, this direction is also simply referred to as the arrangement direction. Further, vertical direction Y in FIG. 12, which is a direction intersecting the arrangement direction, which is a vertical direction in the present embodiment in particular, and which is different from the thickness direction of the base 30, is also referred to as the direction intersecting the arrangement direction of the plurality of resistive heat generators 31, or simply the direction intersecting the arrangement direction. The direction Y intersecting the arrangement direction is a direction along the surface of the base 30 on which the resistive heat generators 31 are arranged and is also a short-side direction of the heater 22 or a conveyance direction of the sheet passing through the fixing device 9.

The plurality of resistive heat generators 31 configure a heat generation portion 35 divided into a plurality of portions arranged in the arrangement direction. The resistive heat generators 31 are electrically coupled in parallel to the pair of electrodes 34A and 34B via the power supply lines 33A and 33B. The pair of electrodes 34A and 34B is disposed on one end of the base 30 in the arrangement direction that is a left end of the base 30 in FIG. 12. The power supply lines 33A and 33B are made of conductors having an electrical resistance value smaller than an electrical resistance value of the resistive heat generators 31. A gap between neighboring resistive heat generators 31 is preferably 0.2 mm or more, and more preferably 0.4 mm or more, from the viewpoint of maintaining the insulation between the neighboring resistive heat generators 31. If the gap between the neighboring resistive heat generators 31 is too large, the gap is likely to cause a temperature decrease in a region corresponding to the gap. Accordingly, from the viewpoint of reducing the temperature unevenness in the arrangement direction, the gap is preferably equal to or shorter than 5 mm, and more preferably equal to or shorter than 1 mm.

The resistive heat generators 31 are made of a material having a positive temperature coefficient (PTC) of resistance and have the characteristic that the resistance value increases to decrease the heater output as the temperature T increases.

Because the resistive heat generators 31 have the PTC characteristic and due to the configuration of the heat generation portion 35 divided up in the arrangement direction, overheating of the fixing belt 20 when small sheets pass through can be prevented. That is, in a case where small sheets each having a width smaller than the entire width of the heat generation portion 35 pass through, because the heat of the fixing belt 20 is not absorbed by the sheets in a region outside the sheet width, there is a corresponding increase in the temperature of the resistive heat generators 31. Because a constant voltage is applied to the resistive heat generators 31, an increase in the temperature of the resistive heat generators 31 in regions outside the sheet width causes an increase in the resistance values of the resistive heat generators 31. Due to this configuration, there is a relative reduction in the output, that is, the heat generation amount of the heater, thus suppressing an increase in the temperature of the end portions. Furthermore, electrically coupling the plurality of resistive heat generators 31 in parallel makes it possible to curb temperature increases in non-sheet passing regions while the print speed is maintained. Note that the heat generators constituting the heat generation portion 35 may also be resistive heat generators other than the resistive heat generators having the PTC characteristic. The resistive heat generators may also be arranged in a plurality of rows in the direction intersecting the arrangement direction of the heater 22.

Thus, because the resistive heat generators 31 are divided up in the arrangement direction, a temperature increase at the aforementioned end portions can be suppressed, thus suppressing temperature unevenness in the arrangement direction of the fixing belt 20. Because the rigidity of the fixing belt 20 changes depending on the temperature thereof, the fixing belt 20 having minimal temperature unevenness in the arrangement direction is advantageous in ensuring the aforementioned stable contact with the conductor 40. Thus, by adopting the configuration including the resistive heat generators 31 divided up in the arrangement direction according to the present embodiment and adopting a configuration, which is described below, that includes the first high thermal conductor 28 and a second high thermal conductor 36, the conductor 40 can be brought into stable contact with the fixing belt 20, which is preferable. Furthermore, in a case where the conductor 40 is placed without providing fasteners such as screws, the above-described configuration is advantageous from the viewpoint of stably bringing the conductor 40 into contact with the fixing belt 20.

The resistive heat generators 31 are formed, for example, by mixing silver-palladium (AgPd), glass powder, and the like to make a paste which is coated onto the base 30 by means of screen printing or the like, whereupon the base 30 is subjected to firing. The resistive heat generators 31 each have a resistance value of 80Ω at room temperature, according to the present embodiment. The material of the resistive heat generators 31 may contain a resistance material, such as silver alloy (AgPt) or ruthenium oxide ($RuO_2$), in addition to the above materials. The material of the power supply lines 33A and 33B and the electrodes 34A and 34B may be formed by using screen-printing or the like of silver (Ag) or silver palladium (AgPd). The power supply lines 33A and 33B are made of a conductor having a smaller electrical resistance value than the resistive heat generators 31.

The material of the base 30 is preferably a nonmetallic material having excellent thermal resistance and insulating properties, such as glass, mica, or ceramic such as alumina or aluminum nitride. In the present embodiment, an alumina base having a thickness of 1.0 mm, a width of 270 mm in the arrangement direction, and a width of 8 mm in the direction intersecting the arrangement direction. Alternatively, the base 30 may be made by layering the insulation material on a conductive material such as metal. Low-cost aluminum or stainless steel is favorable as the metal material of the base 30. By forming the base 30 of a stainless steel plate, cracking due to thermal stress can be suppressed. To improve the thermal uniformity of the heater 22 and the image quality, the base 30 may be made of a material having high thermal conductivity, such as copper, graphite, or graphene.

The insulation layer 32 may be made of a heat-resistant glass having a thickness of 75 μm, for example. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 13:
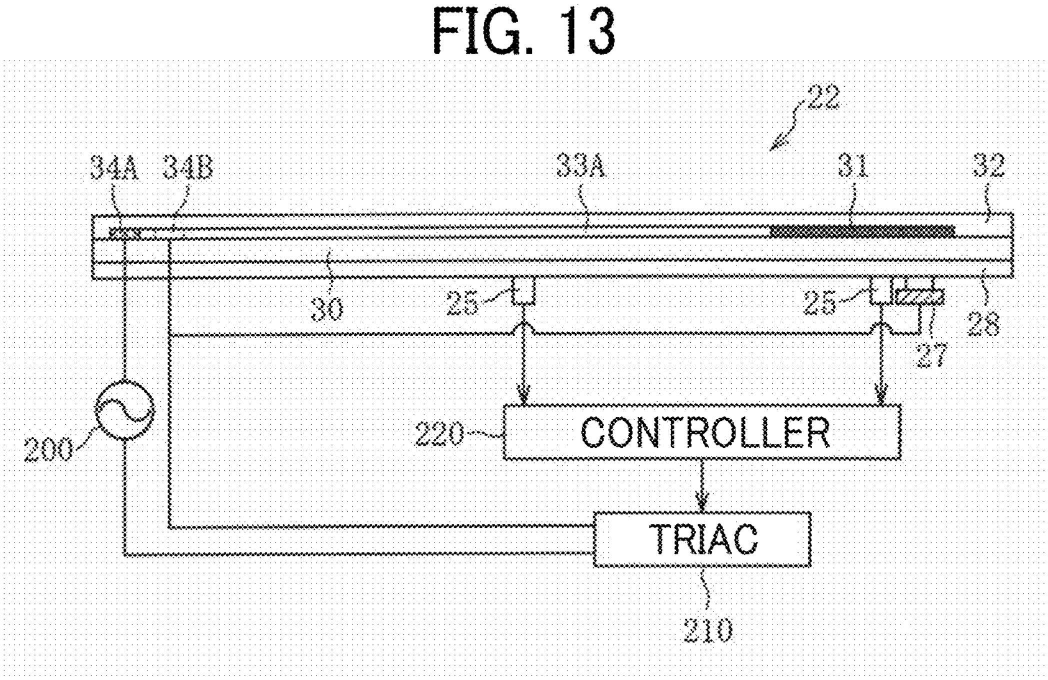
FIG. 13 is a diagram illustrating the supply of power to the heater.

FIG. 13 is a diagram illustrating a circuit for supplying power to the heater according to the present embodiment.

As illustrated in FIG. 13, in the present embodiment, the alternating current power supply 200 is electrically coupled to the electrodes 34A and 34B of the heater 22 to configure a power supply circuit for supplying power to the resistive heat generators 31. The power supply circuit includes a triac 210 that controls the amount of power supplied. A controller 220 controls the amount of power supplied to the resistive heat generators 31 via the triac 210 on the basis of the temperature detected by the thermistors 25. The controller 220 includes a microcomputer including a central processing unit (CPU), a read-only memory (ROM), a random-access memory (RAM), an input and output (I/O) interface, and the like.

In the present embodiment, one thermistor 25 is disposed in a center region of the heater 22 in the arrangement direction, which is the region inside the sheet conveyance width for the smallest sheet, and the other thermistor 25 is disposed on the one end portion side of the heater 22 in the arrangement direction. Thermostats 27, which serve as power cut-off devices, are arranged at the one end portion of the heater 22 in the arrangement direction and cut off the supply of power to the resistive heat generators 31 in a case where the temperature of the resistive heat generators 31 is equal to or higher than a predetermined temperature. The thermistors 25 and the thermostats 27 contact the first high thermal conductor 28 to detect the temperature thereof.

Figure 14:
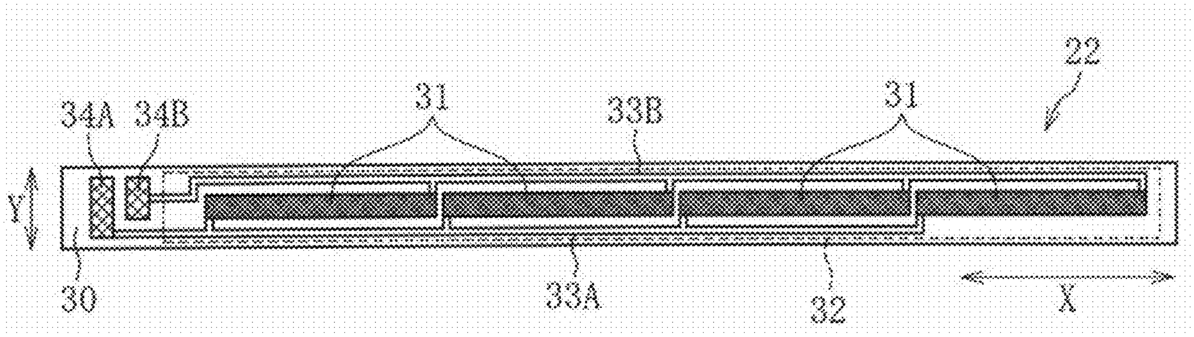
FIG. 14 is a plan view of a heater in which the shape of resistive heat generators is different from the shape in FIG. 12.
Figure 15:
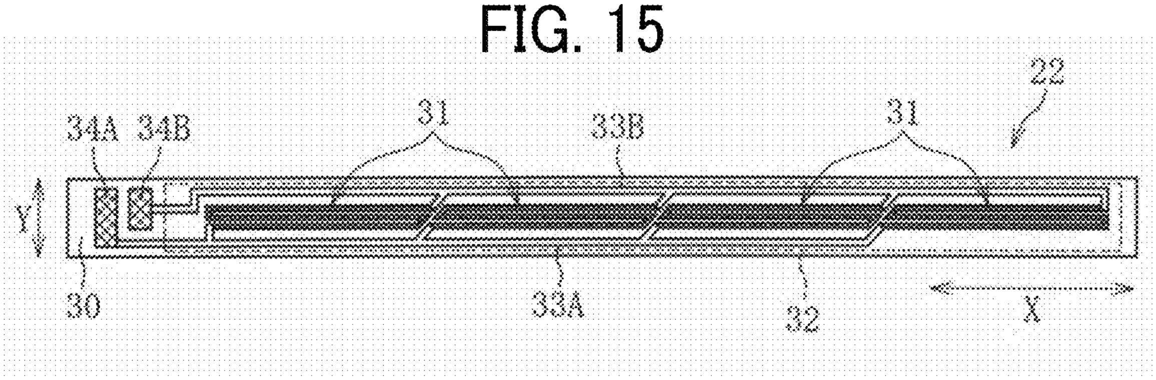
FIG. 15 is a plan view of a heater in which the shape of the resistive heat generators is different from the shapes in FIGS. 12 and 14.

In the present embodiment, the first electrode 34A and the second electrode 34B are provided on the same end portion side in the arrangement direction, but may also be provided on different sides. The shape of resistive heat generator 31 is not limited to the shape according to the present embodiment. For example, as illustrated in FIG. 14, the resistive heat generators 31 may have a rectangular shape or, as illustrated in FIG. 15, the resistive heat generators 31 may be configured by a linear portion and the linear portion may be folded back to form a substantially parallelogram shape. In addition, as illustrated in FIG. 14, portions each extending from block-shaped resistive heat generators 31 toward the power supply lines 33A and 33B (portions extending in the direction intersecting the arrangement direction) may form part of the resistive heat generators 31 or may be made of the same material as the power supply lines 33A and 33B.

Figure 16:
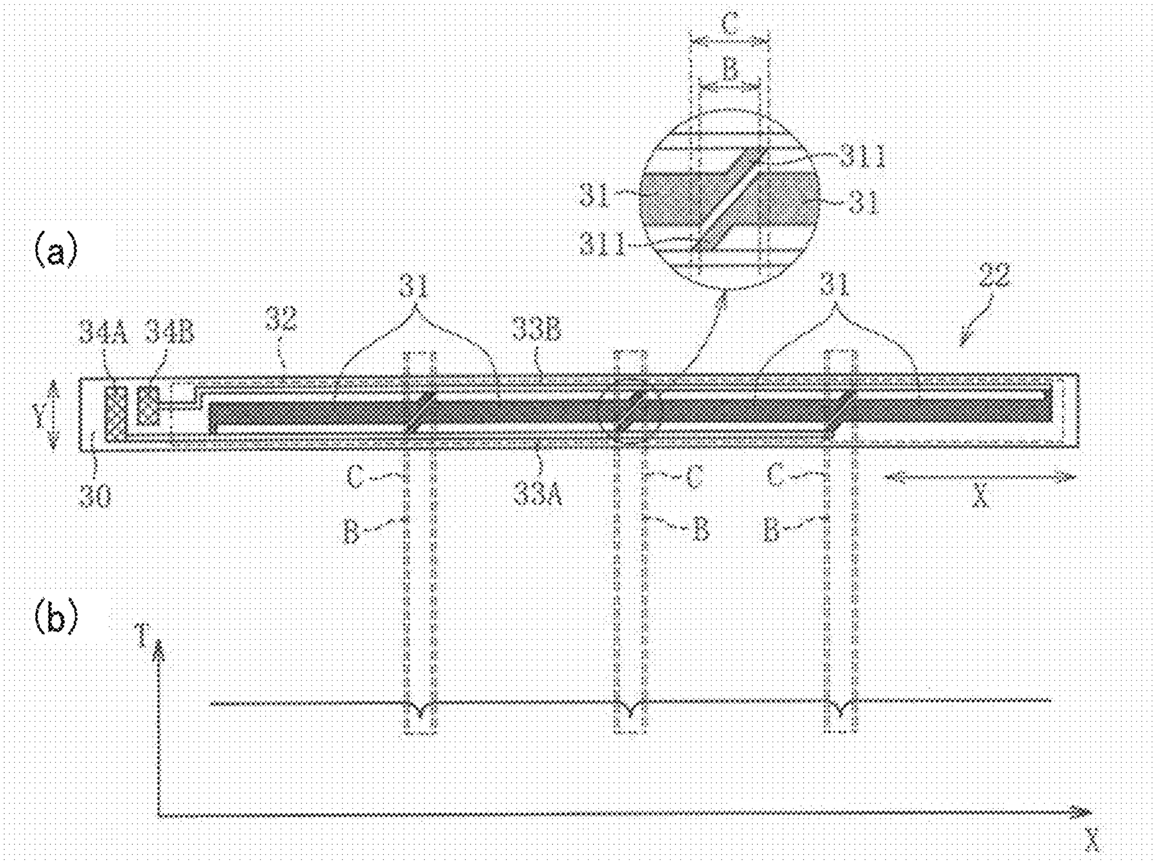
FIG. 16 is a diagram illustrating a temperature distribution of a fixing belt in an arrangement direction, in which (a) is a plan view of a heater and (b) is a diagram illustrating the temperature distribution of the fixing belt.

FIG. 16 is a diagram illustrating a temperature distribution of the fixing belt 20 in the arrangement direction. In FIG. 16, (a) is a diagram illustrating the arrangement of the heater 22. In (b) of FIG. 16, the vertical axis represents the temperature T of the fixing belt 20, and the horizontal axis represents the positions of the fixing belt 20 in the arrangement direction.

As illustrated in FIG. 16, the plurality of resistive heat generators 31 provided to the heater 22 is divided up in the arrangement direction, thus forming division regions B between the resistive heat generators 31. In other words, the plurality of resistive heat generators 31 provided to the heater 22 are arranged with a gap B therebetween. Hereinafter, a range B constituting a division region is referred to as gap B. In gap B, the surface area occupied by the resistive heat generators 31 is smaller than the other regions, and the amount of heat generated is small. As a result, the temperature of the fixing belt 20 in gap B becomes lower than the temperature of the other regions, which causes temperature unevenness in the arrangement direction of the fixing belt 20. Furthermore, the temperatures of the heater 22 and the fixing belt 20 are low even in an enlarged division region C (hereinafter simply called region C) that includes a region around gap B, which is a division region. Note that the temperature of the heater 22 is also a lower temperature in the gap B. Here, as illustrated in the enlarged view of (a) in FIG. 16, the gap B denotes an area in the arrangement direction which includes the entire area in which the resistive heat generators 31, which are the main heat generation parts of the heater 22, are divided up. In addition to gap B, the region including an area corresponding to the connecting part 311 of the resistive heat generators 31 is region C. The connecting part 311 is defined as a portion of the resistive heat generators 31 that extends in the direction intersecting the arrangement direction and that is connected to the power supply lines 33A and 33B.

Figure 17:
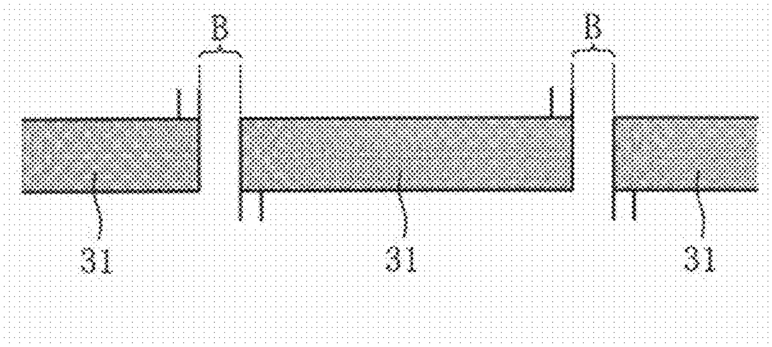
FIG. 17 is a diagram illustrating division regions of the heater of FIG. 14.
Figure 18:
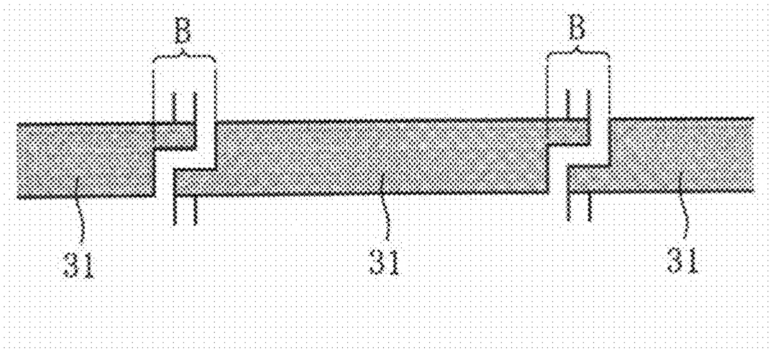
FIG. 18 is a diagram illustrating division regions having a different shape from the shape in FIG. 17.
Figure 19:
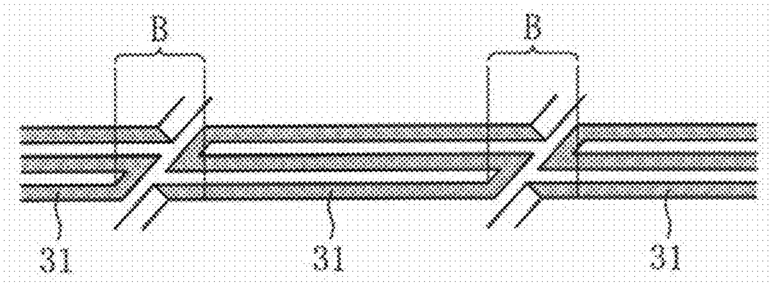
FIG. 19 is a diagram illustrating division regions of the heater of FIG. 15.

As illustrated in FIG. 17, the heater 22 including the rectangular resistive heat generators 31 illustrated in FIG. 14 also has a gap B temperature which is lower than the temperature of the other parts. In addition, in the heater 22 including the resistive heat generators 31 having the shape illustrated in FIG. 18, the gap B temperature is lower than the temperature of the other parts of the heater 22. Furthermore, as illustrated in FIG. 19, in the heater 22 including the resistive heat generators 31 which are shaped as illustrated in FIG. 15, the gap B temperature is lower than the temperature of the other parts. However, as illustrated in FIGS. 16, 18, and 19, adjacent resistive heat generators 31 are made to overlap one another in the arrangement direction, and thus the above-described temperature drop relative to the other areas of gap B can be suppressed.

In the present embodiment, the first high thermal conductor 28 described above is provided in order to reduce the above-described temperature drop in gap B to suppress temperature unevenness in the arrangement direction of the fixing belt 20. Next, a more detailed description of the first high thermal conductor 28 is provided.

As illustrated in FIG. 2, the first high thermal conductor 28 is disposed between the heater 22 and the stay 24 in the left-right direction of FIG. 2 and, more particularly, sandwiched between the heater 22 and the heater holder 23. That is, one side of the first high thermal conductor 28 is brought into contact with the back surface of the base 30, and the other side is brought into contact with the heater holder 23.

The stay 24 has two right-angle portions 24*a* extending in a thickness direction of the heater 22 and each having a contact surface that contacts the heater holder 23 directly or that contacts the heater holder 23 via the conductor 40 to support the heater holder 23, the first high thermal conductor 28, and the heater 22. In the direction intersecting the arrangement direction (the vertical direction in FIG. 2), the contact surfaces are arranged on the outside of the area where the resistive heat generators 31 are provided. Due to this configuration, heat transfer from the heater 22 to the stay 24 is reduced, thus enabling the heater 22 to efficiently heat the fixing belt 20.

As illustrated in FIG. 20, the first high thermal conductor 28 is formed of a plate having a thickness of 0.3 mm, a length of 222 mm in the arrangement direction, and a width of 10 mm in the direction intersecting the arrangement direction. In the present embodiment, the first high thermal conductor 28 is formed of a single plate but may also be formed of a plurality of members. Note that, in FIG. 20, the guide portion 26 and the guide ribs 260 in FIG. 2 are omitted.

The first high thermal conductor 28 is fitted into the concave portion 23*b* of the heater holder 23, and the heater 22 is mounted thereon, thus sandwiching and holding the first high thermal conductor 28 between the heater holder 23 and the heater 22. In the present embodiment, the width of the first high thermal conductor 28 in the arrangement direction is made substantially the same as the width of the heater 22 in the arrangement direction. The first high thermal conductor 28 and the heater 22 regulate movement in the arrangement direction by means of both side walls (arrangement direction regulators) 23*b*1 in the arrangement direction forming the concave portion 23*b*. Thus, regulating the positional deviation of the first high thermal conductor 28 in the arrangement direction in the fixing device 9 improves the thermal conductivity efficiency with respect to a target range in the arrangement direction. In addition, both side walls 23*b*2 (portions regulating movement in the direction intersecting the arrangement direction) forming the concave portion 23*b* regulate movement of the first high thermal conductor 28 and the heater 22 in the direction intersecting the arrangement direction.

Figure 21:
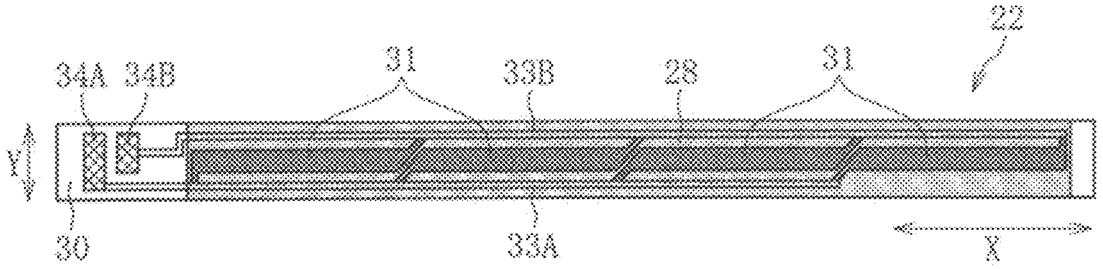
FIG. 21 is a plan view of the heater illustrating the arrangement of the first high thermal conductor.
Figure 22:
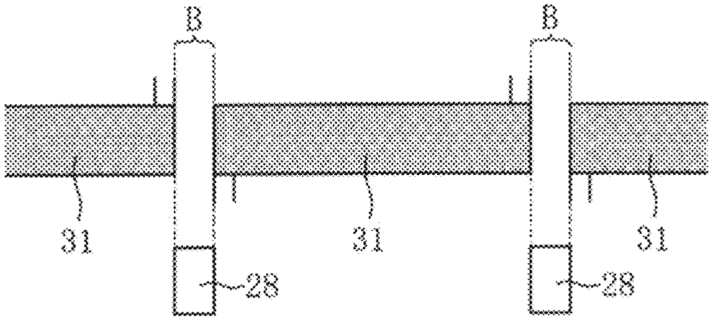
FIG. 22 is a plan view of the heater illustrating a different example of the arrangement of the first high thermal conductor.

The range in which the first high thermal conductor 28 is disposed in the arrangement direction is not limited to the above-described range. For example, as illustrated in FIG. 21, the first high thermal conductor 28 may be disposed so as to face a range corresponding to the heat generation portion 35 in the arrangement direction (see a hatched portion in FIG. 21). In addition, as illustrated in FIG. 22, the first high thermal conductor 28 may also be installed across the entire area in a position corresponding to gap B in the arrangement direction. Note that, in FIG. 22, for the sake of convenience, the resistive heat generators 31 and the first high thermal conductor 28 are shifted in the vertical direction of FIG. 22 but are arranged in substantially the same positions in the direction intersecting the arrangement direction. However, the present invention is not limited to the above arrangement, rather, the first high thermal conductor 28 may be provided to a portion of the resistive heat generator 31 in the direction intersecting the arrangement direction, or may be provided so as to cover the entire resistive heat generator 31 in the direction intersecting the arrangement direction, as illustrated in FIG. 23 (described below).

Figure 23:
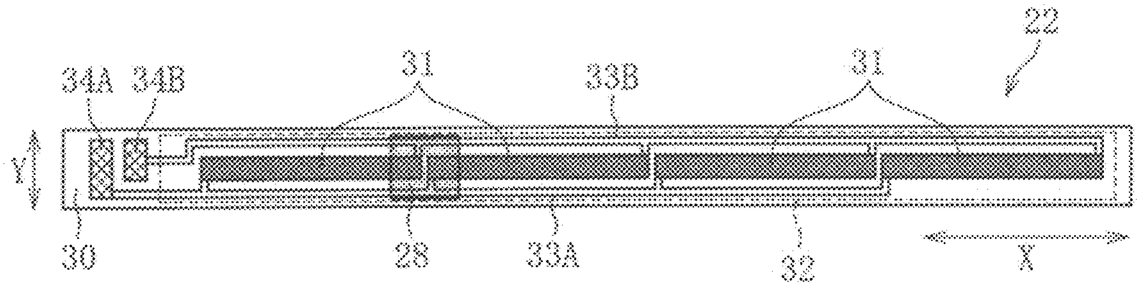
FIG. 23 is a plan view of the heater illustrating another different example of the arrangement of the first high thermal conductor.

Furthermore, as illustrated in FIG. 23, the first high thermal conductor 28 can also be installed to span the resistive heat generators 31 on both sides across gap B in addition to a position corresponding to gap B in the arrangement direction. Providing across the resistive heat generators 31 on both sides means that the position of the first high thermal conductor 28 in the arrangement direction at least partially overlaps the positions of the resistive heat generators 31 on both sides. Note that the first high thermal conductor 28 may be arranged to correspond to all the gaps B of the heater 22, or the first high thermal conductor 28 may be disposed only in a position corresponding to a portion of the gaps B such that the first high thermal conductor 28 is provided, as per FIG. 23, for example, only in a position corresponding to one gap B point. Here, it may be said that the first high thermal conductor 28 being arranged in a position corresponding to gap B in the arrangement direction signifies at least a partial overlap with gap B in the arrangement direction.

Due to the pressing force of the pressure roller 21, the first high thermal conductor 28 is sandwiched between the heater 22 and the heater holder 23 and is brought into close contact with the heater 22 and the heater holder 23. Bringing the first high thermal conductor 28 into contact with the heater 22 improves the heat conduction efficiency of the heater 22 in the arrangement direction. The first high thermal conductor 28 is provided, in the arrangement direction, in a position corresponding to the gap B of the heater 22, thus enabling the thermal conduction efficiency in the gap B to be improved. Due to this arrangement, the amount of heat transferred to the region of the gap B in the arrangement direction can be increased, thereby raising the temperature in the region of the gap B in the arrangement direction. As a result, this arrangement enables a reduction in the temperature unevenness in the arrangement direction of the heater 22. This arrangement thus enables temperature unevenness in the arrangement direction of the fixing belt 20 to be reduced. Therefore, the above-described structure prevents fixing unevenness and gloss unevenness in the image fixed on the sheet. Alternatively, because the heater 22 does not need to generate additional heat to secure sufficient fixing performance in the region of gap B, the energy savings of the fixing device 9 can be implemented. Further, the first high thermal conductor 28 disposed over the entire region of the heat generation portion 35 in the arrangement direction improves the heat transfer efficiency of the heater 22 over the entire area of a main heating region of the heater 22, that is, the image formation region through which the sheet passes, and reduces the temperature unevenness of the heater 22 and of the fixing belt 20 in the arrangement direction.

In the present embodiment in particular, the combination of the configuration of the first high thermal conductor 28 and the resistive heat generators 31 having the PTC characteristic described above effectively prevents overheating by the non-sheet passing region when small sheets pass through. That is, the PTC characteristic suppresses the amount of heat generated by the resistive heat generators 31 in the non-sheet passing region, thus enabling the heat of the non-sheet passing region in which the temperature has risen to be efficiently transferred toward a sheet passing region, and enabling overheating due to the non-sheet passing region to be effectively mitigated.

The first high thermal conductor 28 is preferably disposed in an area around gap B because the small heat generation amount in gap B decreases the temperature thereof. For example, in the present embodiment, providing the first high thermal conductor 28 corresponding to region C (see FIG. 17) particularly improves the heat transfer efficiency of the gap B and the area around the gap B in the arrangement direction and further suppresses the temperature unevenness of the heater 22 in the arrangement direction. According to the present embodiment in particular, the first high thermal conductor 28 is provided across the entire area of the heat generation portion 35 in the arrangement direction. Due to this configuration, temperature unevenness in the arrangement direction of the heater 22 (fixing belt 20) can be further suppressed.

Next, different embodiments of the fixing device are described.

Figure 24:
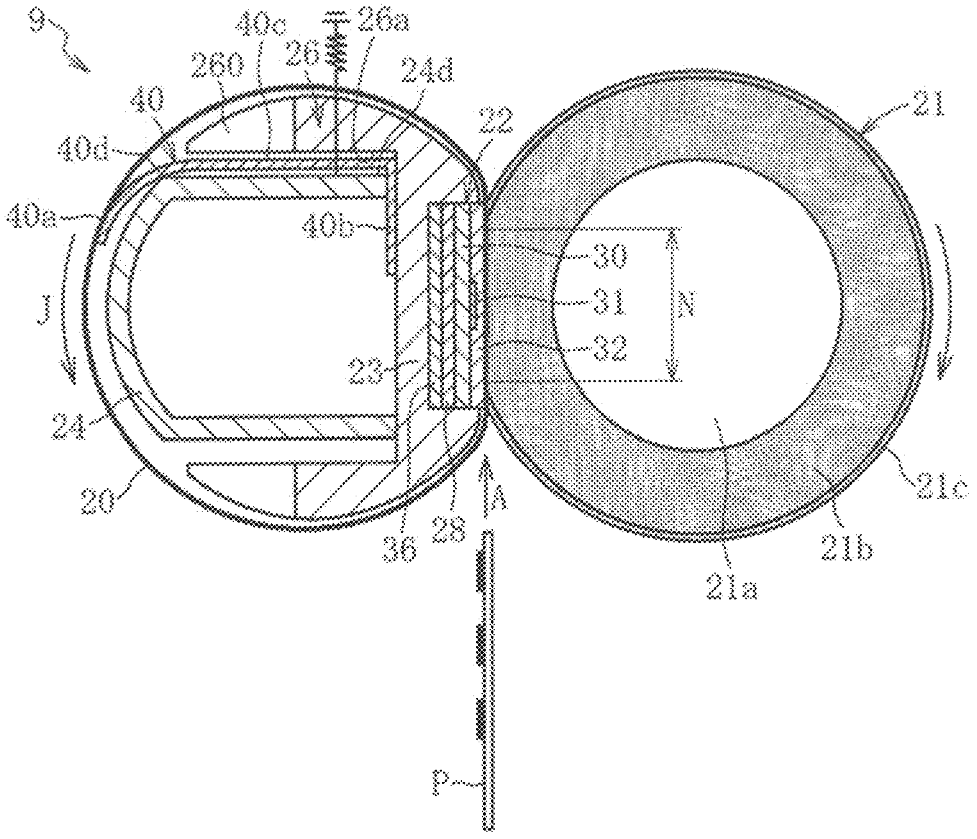
FIG. 24 is a cross-sectional side view of a schematic configuration of a fixing device according to an embodiment different from the embodiment in FIG. 2.

As illustrated in FIG. 24, the fixing device 9 according to the present embodiment includes a second high thermal conductor 36 between the heater holder 23 and the first high thermal conductor 28. The second high thermal conductor 36 is disposed in a position different from the position of the first high thermal conductor 28 in the left-right direction in FIG. 24, which is the stacking direction of members including the heater holder 23, the stay 24, and the first high thermal conductor 28. Specifically, the second high thermal conductor 36 is disposed so as to overlap the first high thermal conductor 28. Note that, unlike FIG. 2, FIG. 24 illustrates a cross-section in which thermistors 25 arranged in the arrangement direction are not provided. That is, FIG. 24 illustrates a cross-section in which the second high thermal conductor 36 is installed.

The second high thermal conductor 36 is made of a material having thermal conductivity higher than the thermal conductivity of the base 30, for example, graphene or graphite. In the present embodiment, the second high thermal conductor 36 is made of a graphite sheet having a thickness of 1 mm. However, the second high thermal conductor 36 may formed of a plate made of aluminum, copper, silver, or the like.

Figure 25:
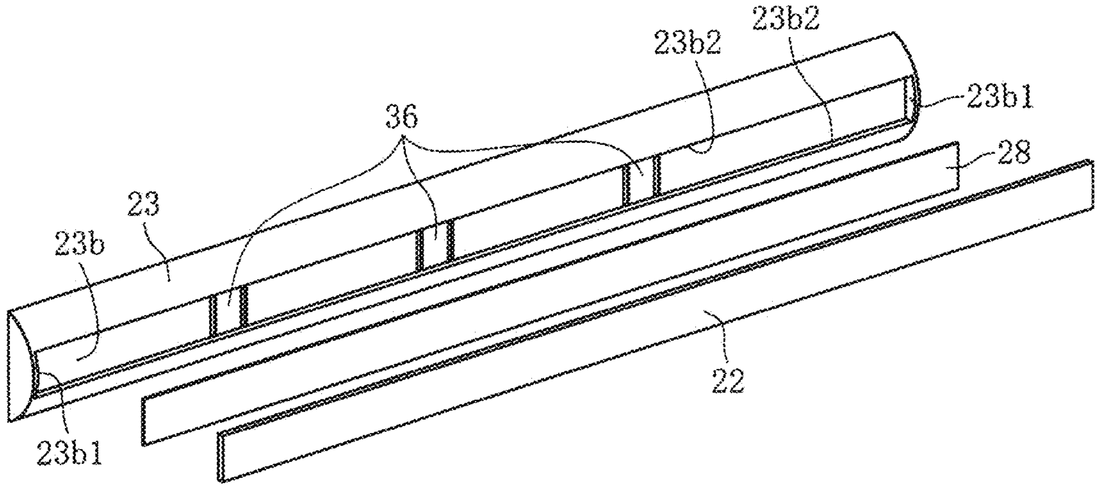
FIG. 25 is a perspective view of the heater, the first high thermal conductor, a second high thermal conductor, and the heater holder.

As illustrated in FIG. 25, a plurality of the second high thermal conductors 36 provided partially in the arrangement direction is arranged in the arrangement direction. The portion of the concave portion **23*b* of the heater holder 23 where the second high thermal conductors 36 are arranged is provided a level deeper than the other portions. Clearances are formed between the heater holder 23 and both sides of the second high thermal conductor 36 in the arrangement direction. Due to this configuration, heat transfer from both sides in the arrangement direction of the second high thermal conductor 36 to the heater holder 23 is suppressed, and the heater 22 is thus capable of efficiently heating the fixing belt 20. Note that, in FIG. 25, the guide portion 26 in FIG. 2** is omitted.

Figure 26:
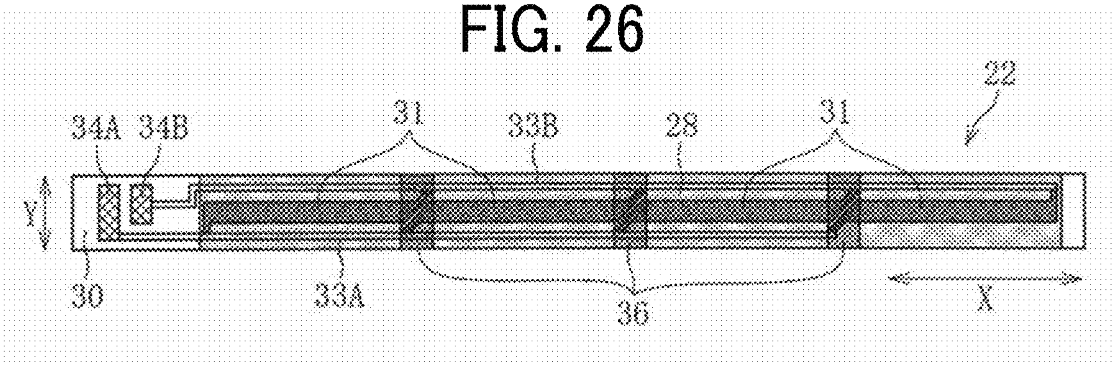
FIG. 26 is a plan view of the heater illustrating an arrangement of the first high thermal conductor and the second high thermal conductor.

As illustrated in FIG. 26, the second high thermal conductor 36 (see the hatched portions) is arranged in a position corresponding to the gap B and provided in a position overlapping at least part of the neighboring resistive heat generators 31 in the arrangement direction. In the present embodiment in particular, the second high thermal conductor 36 is provided to span the entire area of gap B. However, FIG. 26 and FIG. 30, which is described below, illustrate cases where the first high thermal conductor 28 is provided only in a region corresponding to the heat generation portion 35 in the arrangement direction, but the first high thermal conductor 28 according to the present embodiment is not limited to such cases, as described above.

Figure 27:
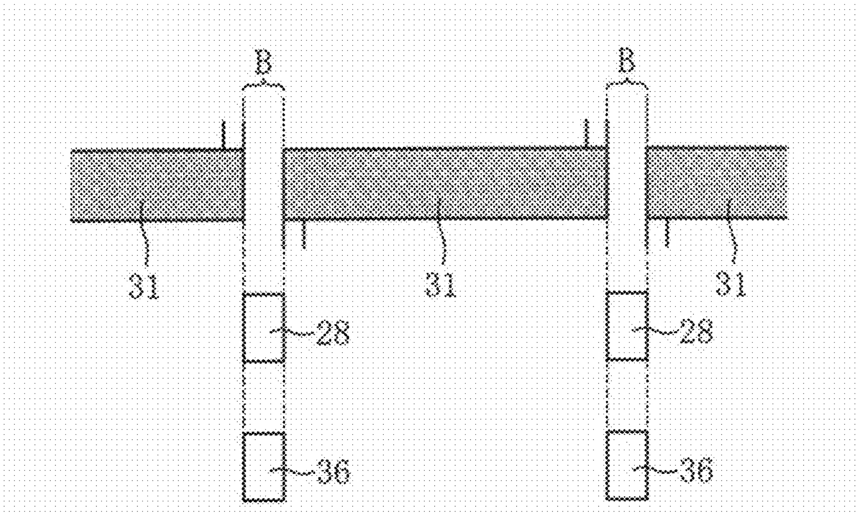
FIG. 27 is a plan view of the heater illustrating an example of a different arrangement of the first high thermal conductor and the second high thermal conductor.

As per the present embodiment, in addition to the first high thermal conductor 28, the fixing device 9 includes the second high thermal conductor 36 in a position corresponding to the gap B in the arrangement direction and a position overlapping at least a portion of the neighboring resistive heat generators 31, thus particularly improving the heat transfer efficiency in the gap B in the arrangement direction and further suppressing the temperature unevenness of the heater 22 in the arrangement direction. Furthermore, particularly preferably, as illustrated in FIG. 27, the first high thermal conductor 28 and the second high thermal conductor 36 are provided only across the entire area in positions corresponding to gap B. The above-described structure is capable of particularly improving the heat transfer efficiency in comparison with other regions, in positions corresponding to gap B. Note that, in FIG. 27, for the sake of convenience, the resistive heat generators 31, the first high thermal conductor 28, and the second high thermal conductor 36 are shifted in the vertical direction of FIG. 27, but are arranged in substantially the same positions in the direction intersecting the arrangement direction. However, the present invention is not limited to the above arrangement, rather, the first high thermal conductor 28 and the second high thermal conductor 36 may be provided to a portion of the resistive heat generator 31 in the direction intersecting the arrangement direction.

In one embodiment of the present invention which differs from the foregoing embodiments, the first high thermal conductor 28 and the second high thermal conductor 36 are formed of the graphene sheet described above. This embodiment enables formation of the first high thermal conductor 28 and the second high thermal conductor 36 which have high thermal conductivity in a predetermined direction along the surface of the graphene, that is, not in the thickness direction but in the arrangement direction. Therefore, the temperature unevenness of the fixing belt 20 and of the heater 22 in the arrangement direction can be effectively reduced.

Figure 28:
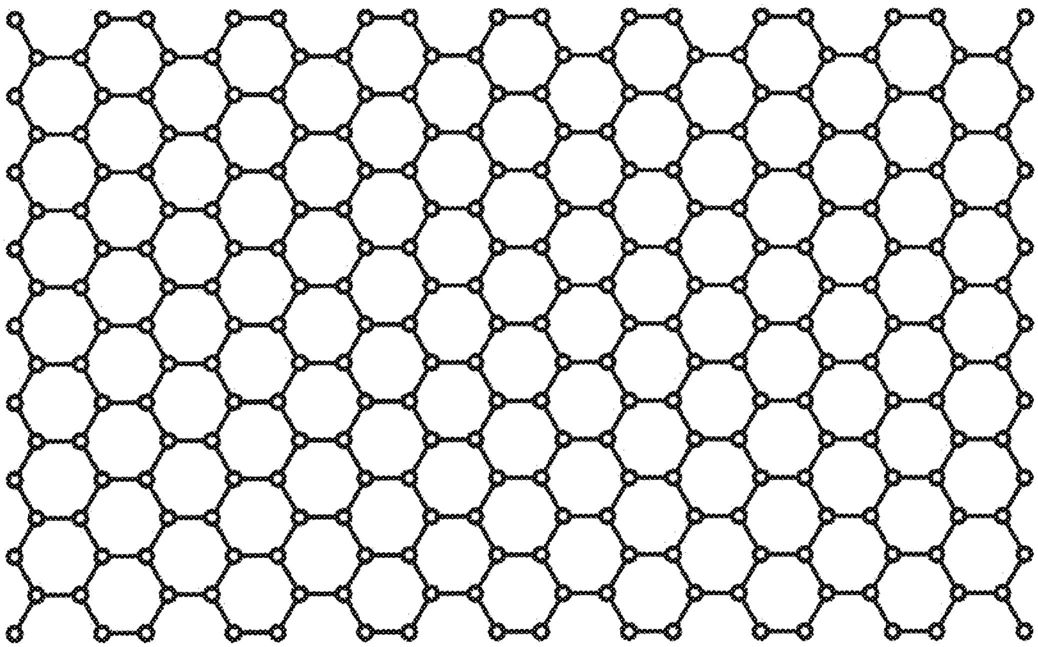
FIG. 28 is a diagram illustrating the atomic crystal structure of graphene.

Graphene is a flaky powder. Graphene has a planar hexagonal lattice structure of carbon atoms, as illustrated in FIG. 28. A graphene sheet is sheet-shaped graphene and is usually a single layer. A single layer of carbon may contain impurities. The graphene may also have a fullerene structure. Fullerene structures are generally recognized as compounds including an even number of carbon atoms, which form a cage-like fused ring polycyclic system with five and six membered rings, including, for example, $C_{60}$, $C_{70}$, and $C_{80}$ fullerenes or other closed cage structures having three-coordinate carbon atoms.

Graphene sheets are artificially made by, for example, the chemical vapor deposition (CVD) method.

Graphene sheets are commercially available. The size and thickness of the graphene sheet or the number of layers of the graphite sheet described below are measured by, for example, a transmission electron microscope (TEM).

Figure 29:
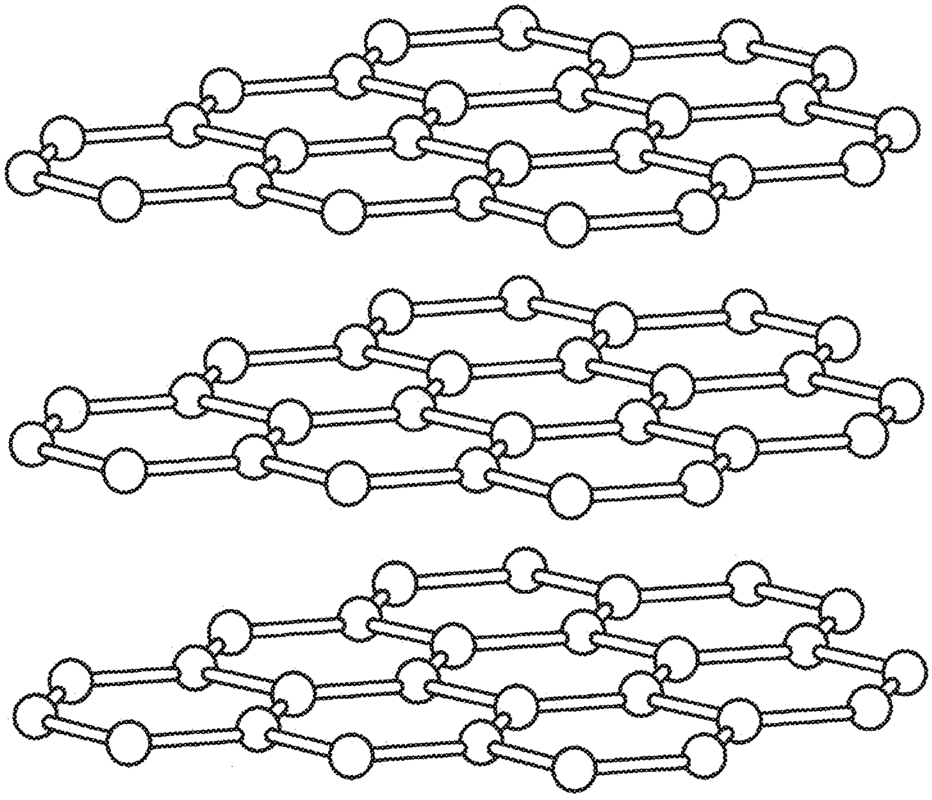
FIG. 29 is a diagram illustrating the atomic crystal structure of graphite.

Graphite obtained by multilayering graphene has a large thermal conduction anisotropy. As illustrated in FIG. 29, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. A covalent bond has a larger bonding force than a van der Waals bond, and hence there is a large anisotropy between the bond between carbon atoms in a layer and the bond between carbon atoms in different layers. That is, the first high thermal conductor 28 or the second high thermal conductor 36 are made of graphite, and thus have a heat transfer efficiency in the arrangement direction which is greater than the heat transfer efficiency in the thickness direction of the first high thermal conductor 28 and the second high thermal conductor 36 (that is, the stacking direction of these members), which enables heat transfer to the heater holder 23 to be suppressed. Accordingly, the temperature unevenness of the heater 22 in the arrangement direction can be efficiently suppressed, and the heat transferred to the heater holder 23 can be minimized. Because the first high thermal conductor 28 or the second high thermal conductor 36 are made of graphite, and therefore are not oxidized up to about 700 degrees, thus affording the first high thermal conductor 28 and the second high thermal conductor 36 an excellent heat resistance.

The physical properties and dimensions of the graphite sheet may be appropriately changed according to the function required for the first high thermal conductor 28 or the second high thermal conductor 36. For example, the anisotropy of the thermal conduction can be increased by using high-purity graphite or single-crystal graphite or increasing the thickness of the graphite sheet. A thin graphite sheet may be used to reduce the thermal capacity of the fixing device 9 so that the fixing device 9 is capable of performing high-speed printing. Furthermore, the width of the first high thermal conductor 28 or of the second high thermal conductor 36 in the arrangement direction may be increased in the case of a large width of the fixing nip N or of the heater 22.

From the viewpoint of increasing mechanical strength, the number of layers of the graphite sheet is preferably 11 or more. The graphite sheet may partially include a single layer portion and a multilayer portion.

Figure 30:
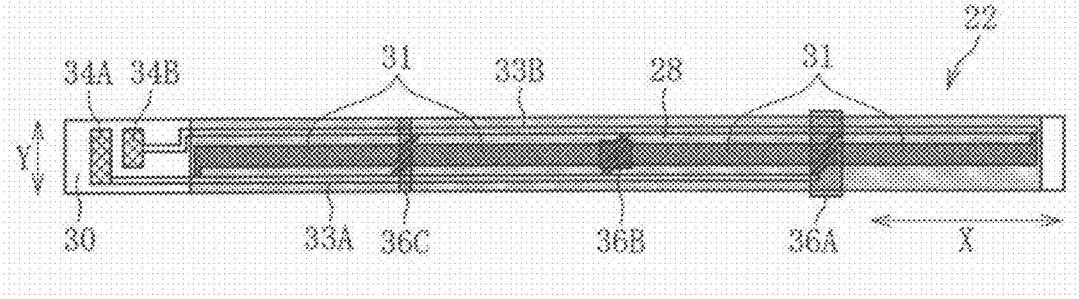
FIG. 30 is a plan view of a heater in which the arrangement of the second high thermal conductor is different from the arrangement in FIG. 26.

As long as the second high thermal conductor 36 is provided in a position overlapping at least part of the neighboring resistive heat generators 31, in the arrangement direction, in a position corresponding to gap B (and region C), the configuration of the second high thermal conductor 36 is not limited to the configuration illustrated in FIG. 26. For example, as illustrated in FIG. 30, a second high thermal conductor 36A is provided, in the direction intersecting the arrangement direction, so as to extend to both sides beyond the base 30 in the direction intersecting the arrangement direction. A second high thermal conductor 36B is provided, in the direction intersecting the arrangement direction, in the area where the resistive heat generators 31 are arranged. A second high thermal conductor 36C is provided to part of the gap B.

Figure 31:
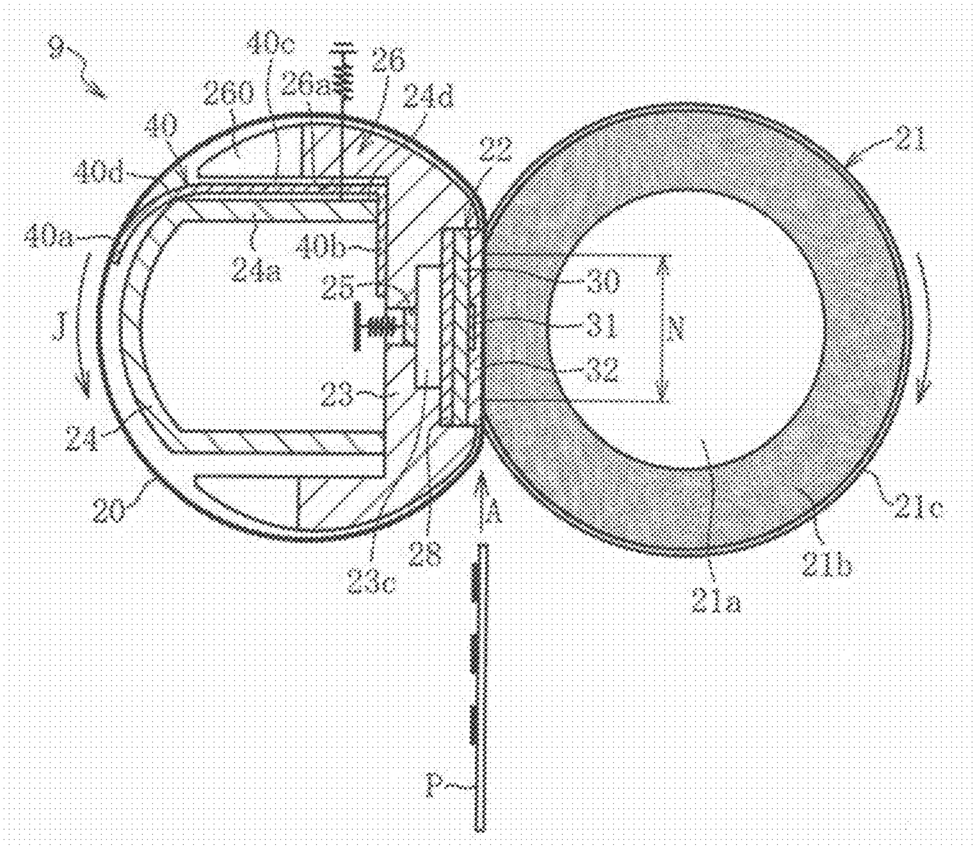
FIG. 31 is a cross-sectional side view of a schematic configuration of a fixing device according to a different embodiment from the embodiments illustrated in FIGS. 2 and 24.

As illustrated in FIG. 31, in the present embodiment, a gap is provided between the first high thermal conductor 28 and the heater holder 23, in the left-right direction in FIG. 31, which is the thickness direction. That is, provided in a partial region of the concave portion 23*b* (see FIG. 25) for arranging the heater 22 of the heater holder 23, the first high thermal conductor 28, and the second high thermal conductor 36 is an escape portion 23*c* that serves as a heat insulating layer so that the depth of the concave portion 23*b* is deeper than the other portion receiving the first high thermal conductor 28. This partial region is a partial region in the direction intersecting the arrangement direction in a portion of, or the whole of, areas other than the area where the second high thermal conductor 36 is provided in the arrangement direction. The above-described configuration minimizes the contact area between the heater holder 23 and the first high thermal conductor 28. Therefore, heat transfer from the first high thermal conductor 28 to the heater holder 23 is suppressed, and the heater 22 is thus capable of efficiently heating the fixing belt 20. Note that, in a cross-section, in the arrangement direction, where the second high thermal conductor 36 is provided, the second high thermal conductor 36 is in contact with the heater holder 23 as illustrated in FIG. 24 of the above-described embodiment.

Furthermore, in the present embodiment in particular, the escape portion 23*c* is provided spanning the entire area where the resistive heat generators 31 are provided in the vertical direction in FIG. 31, which is the direction intersecting the arrangement direction. Due to this configuration, heat transfer from the first high thermal conductor 28 to the heater holder 23 is suppressed, and the heater 22 is thus capable of efficiently heating the fixing belt 20. Note that the configuration may include, as a thermal insulation layer, a thermal insulator having a lower thermal conductivity than the heater holder 23 instead of including a space like the escape portion 23*c*.

Furthermore, in the above description, the second high thermal conductor 36 is provided as a member different from the first high thermal conductor 28, but the present embodiment is not limited to configuration. For example, the first high thermal conductor 28 is configured such that the portion of the first high thermal conductor 28 corresponding to gap B is thicker than the other portions thereof.

In the foregoing embodiments illustrated in FIG. 24 or 31, the conductor 40 is made to face the first opposing surface 24*d* of the stay 24 or is made to face the second opposing surface 26*a* of the guide portion 26, and thus the contact state of the conductor 40 with the inner surface of the fixing belt 20 can be stabilized as per the foregoing embodiments. The above-described configuration affords such advantageous effects without using fasteners such as screws to secure the conductor 40 to a predetermined member in the fixing device. Accordingly, because the above-described configuration does not require a space for arranging fasteners such as screws, the fixing device can be made compact. Reducing the thermal capacity of the fixing device also enables energy savings.

Embodiments of the present invention are described hereinabove, but the present invention is not limited to or by the foregoing embodiments. It is therefore understood that, within a scope not departing from the spirit of the present invention, numerous additional modifications and variations are possible.

Figure 32:
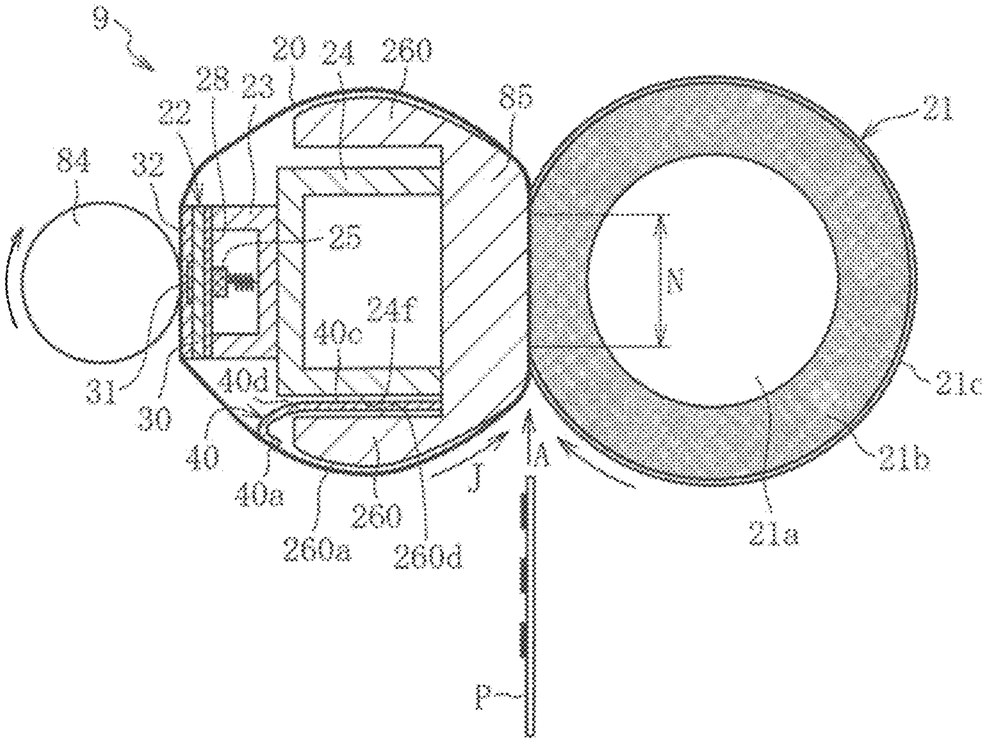
FIG. 32 is a cross-sectional side view of a schematic configuration of a fixing device different from the foregoing fixing device.
Figure 33:
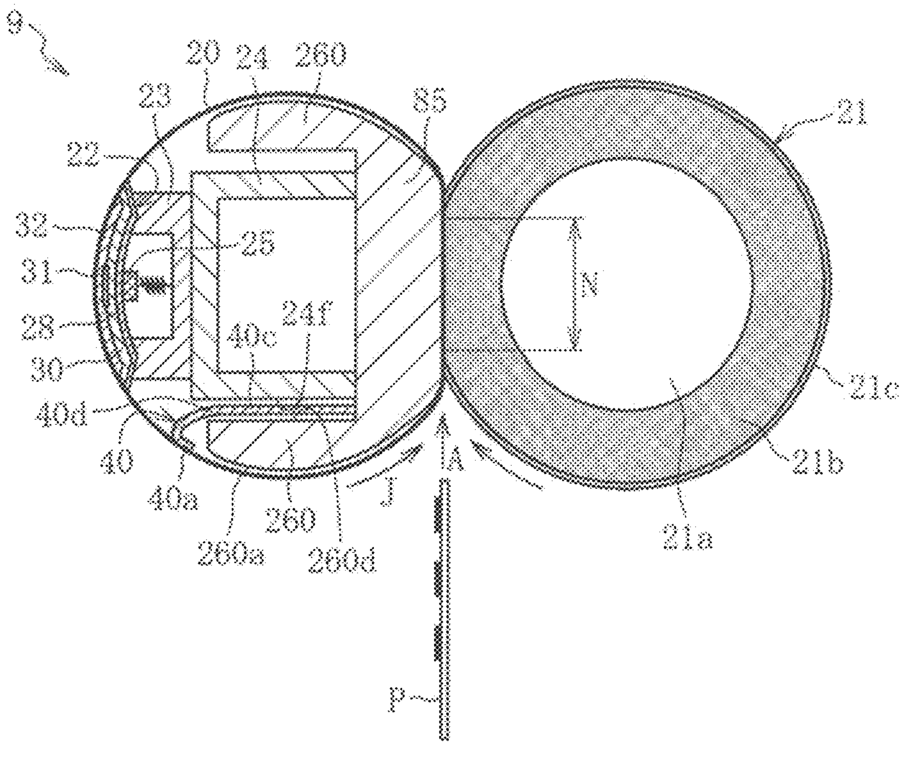
FIG. 33 is a cross-sectional side view of a schematic configuration of a fixing device different from the foregoing fixing device.
Figure 34:
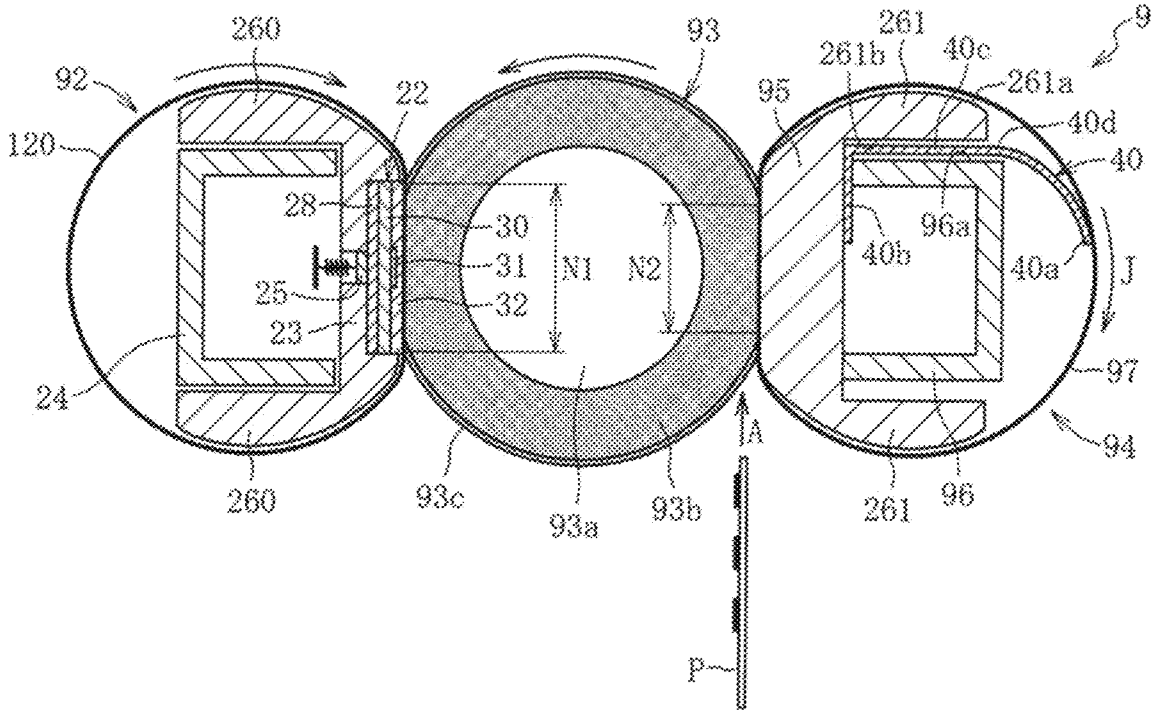
FIG. 34 is a cross-sectional side view of a schematic configuration of a fixing device different from the foregoing fixing device.

Furthermore, in addition to the fixing devices described above, the present invention is also applicable to fixing devices as illustrated in FIGS. 32 to 34. The fixing device configurations illustrated in FIGS. 32 to 34 are briefly described below.

First, the fixing device 9 illustrated in FIG. 32 includes a pressurization roller 84 on the opposite side to the pressure roller 21 side relative to the fixing belt 20. The pressurization roller 84 is an opposing rotator that rotates and lies opposite the fixing belt 20 serving as the fixing rotator. The pressurization roller 84 and the heater 22 are configured to perform heating while the fixing belt 20 is sandwiched therebetween. Meanwhile, a nip former 85 is disposed on the inner circumference of the fixing belt 20, on the pressure roller 21 side. The nip former 85 is supported by the stay 24. The nip former 85 sandwiches the fixing belt 20 together with the pressure roller 21, thereby forming the fixing nip N.

The guide ribs 260 are arranged upstream and downstream from the nip former 85. The conductor 40 is disposed between the upstream guide rib 260 and the stay 24. Specifically, the opposing portion 40*c* of the conductor 40 is provided facing a first opposing surface 260*d* of the upstream guide rib 260, which constitutes a first opposing member, and a second opposing surface 24*f* of the stay 24, which constitutes a second opposing member, according to the present embodiment. The opposing portion 40*c* is disposed along the first opposing surface 260*d* and the second opposing surface 24*f*. The one end 40*a* of the conductor 40 is in contact with the inner surface of the fixing belt 20 serving as the fixing rotator.

Next, the pressurization roller 84 described above is not included in the fixing device 9 illustrated in FIG. 33, and the heater 22 is formed as an arc that corresponds to the curvature of the fixing belt 20 in order to secure the length of the contact, in the circumferential direction, between the fixing belt 20 and the heater 22. Otherwise, the configuration is the same as the fixing device 9 illustrated in FIG. 32.

Finally, the fixing device 9 illustrated in FIG. 34 will be described. The fixing device 9 includes a heating assembly 92, a fixing roller 93, which is a fixer, and a pressure assembly 94, which is an opposing pressing member. The heating assembly 92 includes the heater 22, the first high thermal conductor 28, the heater holder 23, and the stay 24, which are described in the above embodiments, and a heating belt 120 serving as a fixing rotator. The fixing roller 93 is an opposing rotator that rotates and faces the heating belt 120 serving as a fixing rotator. The fixing roller 93 includes a solid iron core 93*a*, an elastic layer 93*b* formed on the surface of the core 93*a*, and a release layer 93*c* formed on the outside of the elastic layer 93*b*. The pressure assembly 94 is provided on the opposite side to the heating assembly 92 side, relative to the fixing roller 93. Arranged in the pressure assembly 94 are a nip former 95 and a stay 96, and a pressure belt 97 is rotatably arranged to wrap around the nip former 95 and the stay 96. The sheet P passes through the fixing nip N2 between the pressure belt 97 and the fixing roller 93 so as to heat and press sheet P, thereby fixing an image thereon. Arrow J in FIG. 34 indicates the rotation direction of the pressure belt.

Guide ribs 261 are arranged upstream and downstream from the nip former 95, respectively. A plurality of guide ribs 261 are arranged in the arrangement direction and are substantially fan-shaped. The guide ribs 261 each have a belt opposing surface 261*a* that is arc-shaped or that has a convex curved surface extending in a belt circumferential direction so as to face the inner circumferential surface of the pressure belt 97.

The conductor 40 is disposed between the stay 96 and the downstream guide rib 261. Specifically, the opposing portion 40*c* of the conductor 40 is provided facing a first opposing surface 96*a* of a stay 96, which constitutes a first opposing member, and a second opposing surface 261*b* of the downstream guide rib 261, which constitutes a second opposing member, according to the present embodiment. The opposing portion 40*c* of the conductor 40 is disposed along the first opposing surface 96*a* and the second opposing surface 261*b*. The one end 40*a* of the conductor 40 is in contact with the inner surface of the pressure belt 97 serving as the fixing rotator. Note that, in a case where the surface layer of the fixing roller 93 and the heating belt 120 are made of a conductive material, the conductor 40 may be disposed so as to face the first opposing surface of the stay 24 and the second opposing surface of the upstream guide rib 260, similarly to the embodiment of FIG. 2. In this case, the one end of the conductor 40 is in contact with the inner surface of the heating belt 120, which serves as the fixing rotator.

Arranging the conductor 40 as per the fixing devices of FIGS. 32 to 34 enables stable contact between the conductor 40 and the inner surface of the fixing belt 20 (or the inner surface of the pressure belt 97). Therefore, the conductor 40 is capable of appropriately destaticizing the fixing belt 20 or the pressure belt 97. The above-described configuration affords such advantageous effects without using fasteners such as screws to fix the conductor 40 to a predetermined member in the fixing device. Accordingly, because the above-described configuration does not require a space for arranging fasteners such as screws, the fixing device can be made compact. Reducing the thermal capacity of the fixing device also enables energy savings.

Furthermore, the present invention is not limited to the fixing device described in the foregoing embodiments, rather, the fixing device according to the present invention is also applicable to, for example, a heating device such as a dryer that dries ink applied to a sheet, a laminator that heats, under pressure, a film serving as a covering member onto the surface of a sheet of paper or the like, and a heating device such as a thermocompression device like a heat sealer that uses heat and pressure to seal a seal portion of a packaging material.

The image forming apparatus according to the present invention may be not only a color image forming apparatus as illustrated in FIG. 1 but also, for example, a monochrome image forming apparatus, a copier, a printer, a facsimile machine, or a multifunction peripheral.

Figure 35:
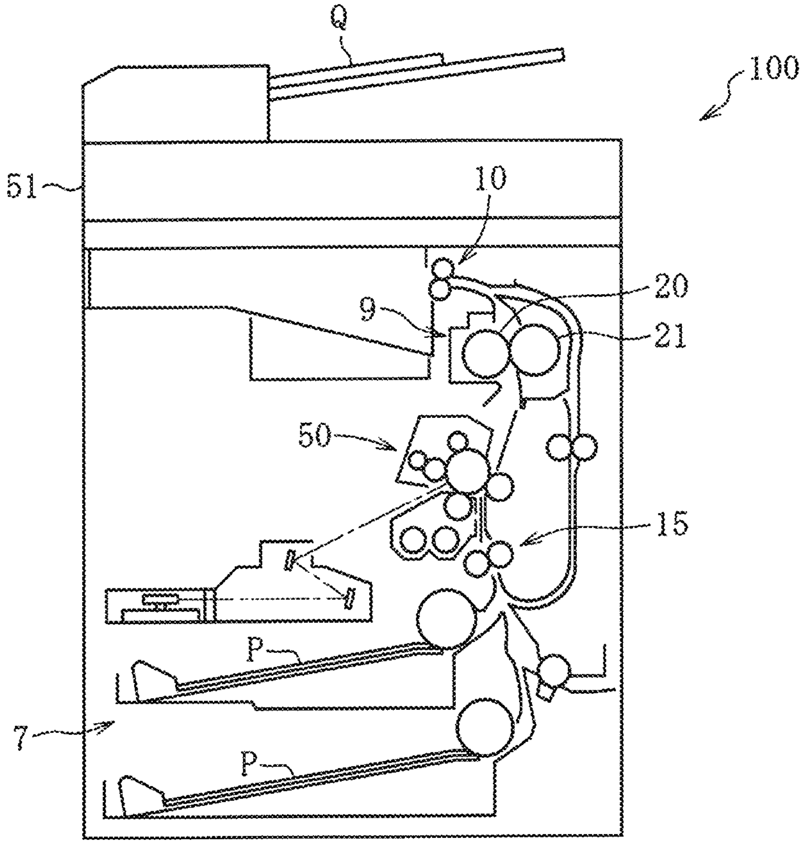
FIG. 35 is a schematic view of a configuration of an image forming apparatus different from the image forming apparatus of FIG. 1.

For example, as illustrated in FIG. 35, the image forming apparatus 100 according to the present embodiment includes an image forming device 50 including a photoconductor drum and the like, a sheet conveyer including the timing roller pair 15 or the like, the sheet feeder 7, the fixing device 9, the sheet ejection device 10, and a reading portion 51. The sheet feeder 7 includes a plurality of sheet feeding trays, and the sheet feeding trays each store sheets of different sizes.

The reading portion 51 reads an image of a document Q. The reading portion 51 generates image data from the read image. The sheet feeder 7 stores the plurality of sheets P and feeds the sheets P to the conveyance path. The timing rollers 15 convey the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaner, and a destaticizing device. The toner image is, for example, an image of document Q. The fixing device 9 heats and presses the toner image to fix the toner image to the sheet P. Conveyance rollers or the like convey the sheet P, on which the toner image has been fixed, to the sheet ejection device 10. The sheet ejection device 10 ejects the sheet P to outside the image forming apparatus 100.

Next, the fixing device 9 according to the present embodiment will be described. A description of configurations common to those of the fixing devices of the above-described embodiments is omitted as appropriate.

Figure 36:
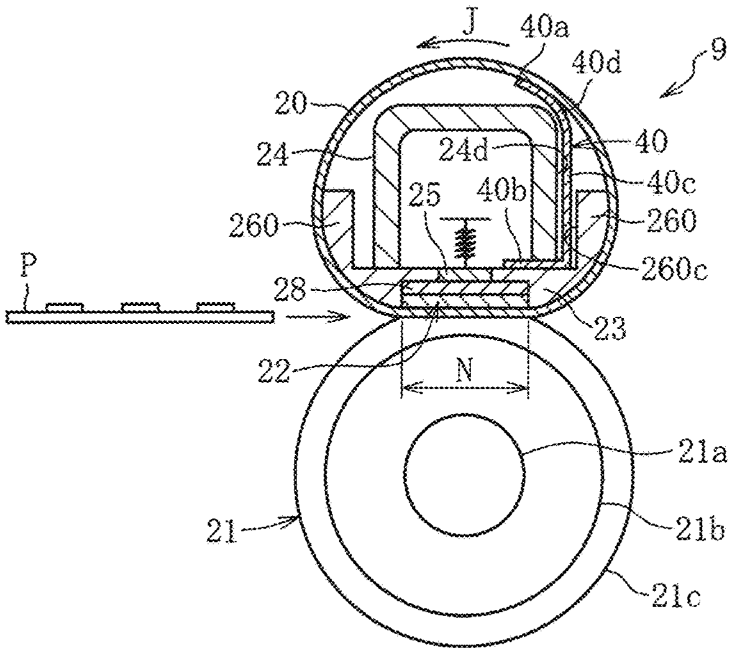
FIG. 36 is a cross-sectional side view of a schematic configuration of a fixing device according to an embodiment of the present invention.

As illustrated in FIG. 36, the fixing device 9 includes the fixing belt 20, the pressure roller 21, the heater 22, the heater holder 23, the stay 24, the thermistor 25, the first high thermal conductor 28, and the conductor 40, and the like.

The fixing nip N is formed between the fixing belt 20 and the pressure roller 21. The nip width of the fixing nip Nis 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the release layer 21*c*. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generators and the like, and the insulation layer, and is formed to have an overall thickness of 1 mm. A width Y of the heater 22 in the direction intersecting the arrangement direction is 13 mm.

The conductor 40 is disposed between the stay 24 and the downstream guide rib 260. Specifically, the opposing portion 40*c* of the conductor 40 is provided facing a first opposing surface 24*d* of the stay 24, which constitutes a first opposing member, and a second opposing surface 260*c* of the downstream guide rib 260, which constitutes a second opposing member. The one end 40*a* of the conductor 40 is in contact with the inner surface of the fixing belt 20, which serves as a fixing rotator.

Figure 37:
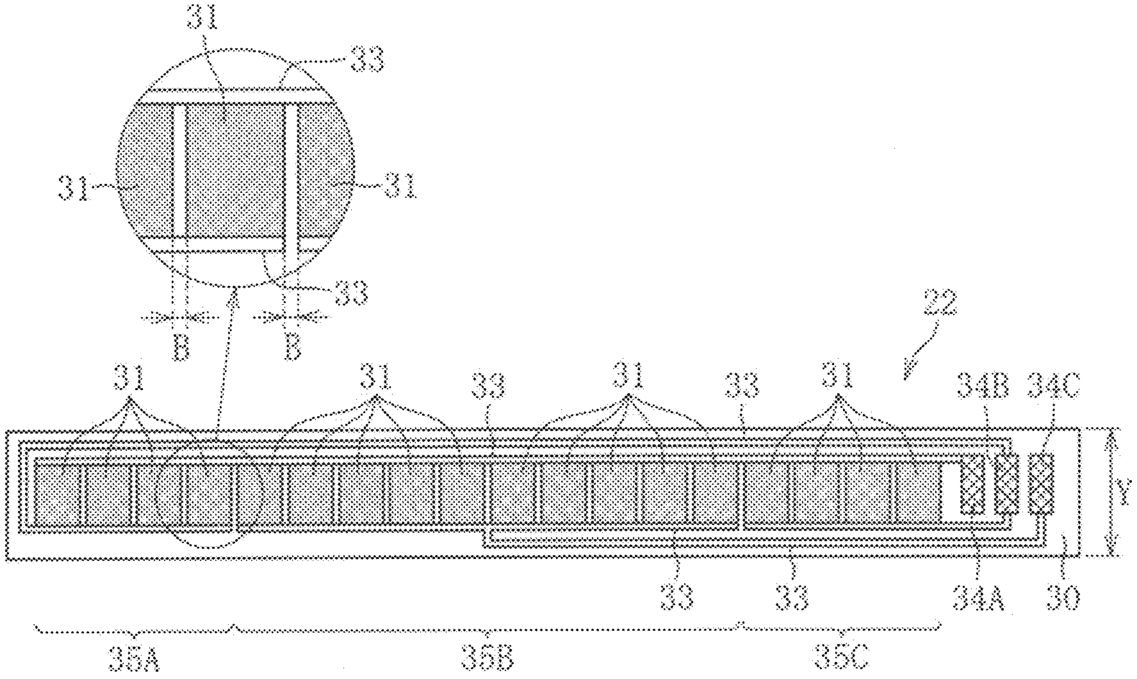
FIG. 37 is a plan view of the heater in the fixing device of FIG. 36.

As illustrated in FIG. 37, the conductor layer of the heater 22 includes a plurality of resistive heat generators 31, power supply lines 33, and electrodes 34A to 34C. In this embodiment, as illustrated in the enlarged view of FIG. 37, gap B, which constitutes a division region with which the plurality of resistive heat generators 31 are divided up in the arrangement direction, is formed (that is, although gap B is illustrated only in the enlarged view of FIG. 37, in reality, gap B is provided between all the resistive heat generators 31). The resistive heat generators 31 constitute three heat generation portions 35A to 35C. When current flows in the electrodes 34A and 34B, the heat generation portions 35A and 35C generate heat. When current flows in the electrodes 34A and 34C, the heat generation portion 35B generates heat. For example, in a case where the fixing operation is performed on a small sheet, the heat generation portion 35B can be made to generate heat, and in a case where the fixing operation is performed on a large sheet, all the heat generation portions 35A to 35C can be made to generate heat.

Figure 38:
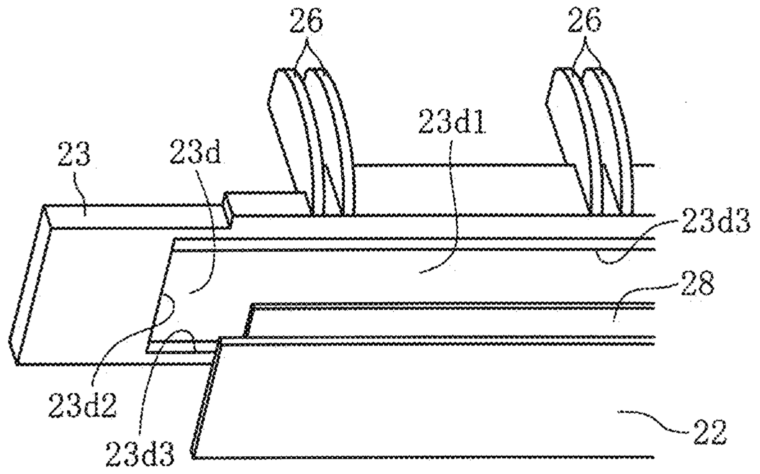
FIG. 38 is a perspective view of the heater and the heater holder.

As illustrated in FIG. 38, the heater holder 23 holds the heater 22 and the first high thermal conductor 28 in a concave portion 23*d*. The concave portion 23*d* is provided on the heater 22 side of the heater holder 23. The concave portion 23*d* includes a bottom surface 23*d*1, and walls 23*d*2 and 23*d*3. The bottom surface 23*dl* is substantially parallel to the base 30 and concave toward the stay 24 from the other side of the heater 22. The wall 23*d*2 is provided on the inside of the heater holder 23 on both sides (or on one side) of the heater holder 23 in the arrangement direction. The wall 23*d*3 is provided on the inside of the heater holder 23 on both sides in the direction intersecting the arrangement direction. The heater holder 23 includes the guide portion 26. The heater holder 23 is made of LCP (liquid crystal polymer).

Figure 39:
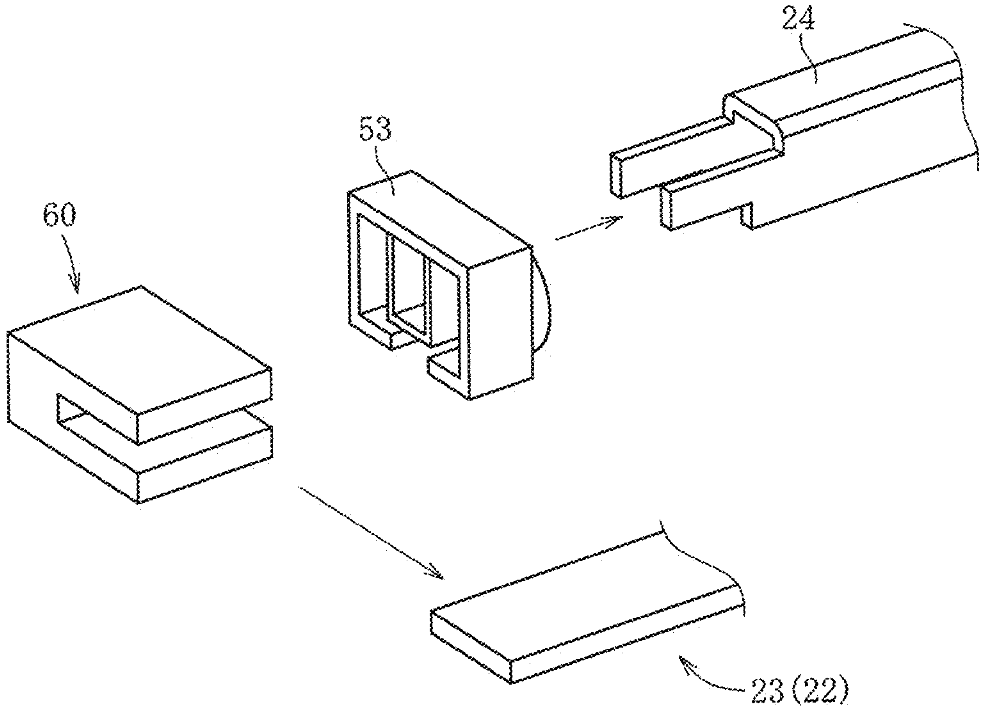
FIG. 39 is a perspective view of a state where a connector is attached to the heater.

As illustrated in FIG. 39, a connector 60 includes a housing made of resin (for example, LCP) and a plurality of contact terminals provided inside the housing.

The connector 60 is attached with the heater 22 and the heater holder 23 sandwiched together from the front and rear sides. In this state, the contact terminals contact (press against) the electrodes of the heater 22, respectively, and the heat generation portion 35 is electrically coupled, via the connector 60, to the power supply provided to the image forming apparatus. The above-described configuration enables power to be supplied from the power supply to the heat generation portion 35. Note that at least part of each of the electrodes 34A to 34C is not coated by the insulation layer and is therefore exposed, in order to secure a connection with the connector 60.

A flange 53 is provided on both sides of the fixing belt 20 in the arrangement direction to hold both edges of the fixing belt 20 from inside the belt. The flange 53 is fixed to a housing of the fixing device 9. The flange 53 is inserted into each of both ends of the stay 24 (see the direction of the arrow from the flange 53 in FIG. 39).

The direction in which the connector 60 is attached to the heater 22 and the heater holder 23 is the direction intersecting the arrangement direction (see the direction indicated by the arrow from the connector 60 in FIG. 39). The configuration is such that, when the connector 60 is attached to the heater holder 23, a convex portion disposed on one of the connector 60 and the heater holder 23 engages with a concave portion disposed on the other of the connector 60 and the heater holder 23 to establish relative movement of the convex portion inside the concave portion. The connector 60 is attached to the heater 22 and the heater holder 23 on either side in the arrangement direction and on the opposite side to the side where the drive motor of the pressure roller 21 is provided.

Figure 40:
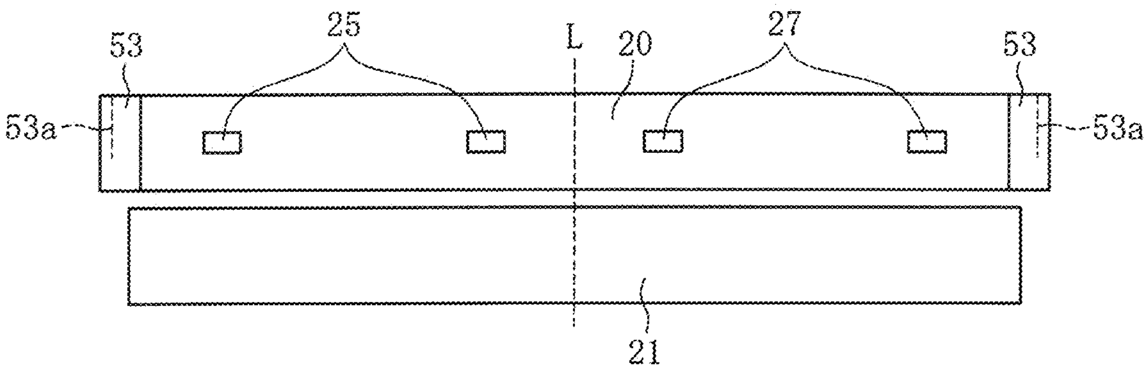
FIG. 40 is a diagram illustrating an arrangement of thermistors and thermostats.

As illustrated in FIG. 40, thermistors 25 are provided facing the inner circumferential surface of the fixing belt 20 and toward the center of, and toward the end portions of the fixing belt 20, respectively, in the arrangement direction. The heater 22 is controlled on the basis of the temperature toward the center of, and the temperature toward the end portions of the fixing belt 20, respectively, in the arrangement direction, the temperatures being detected by the thermistors 25.

Thermostats 27 are provided facing the inner circumferential surface of the fixing belt 20 and toward the center of, and toward the end portions of the fixing belt 20, respectively, in the arrangement direction. The thermostats 27 each shut off the current to the heater 22 in a case where the temperature of the fixing belt 20, as detected by the thermostats 27, exceeds a predetermined threshold value.

Flanges 53 that hold the end portions of the fixing belt 20 are arranged at both ends of the fixing belt 20 in the arrangement direction. The flange 53 is made of LCP (liquid crystal polymer).

Figure 41:
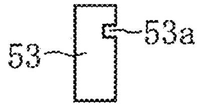
FIG. 41 is a diagram illustrating a groove portion of a flange.

As illustrated in FIG. 41, the flange 53 has a slide groove 53*a*. The slide groove 53*a* extends in a direction in which the fixing belt 20 moves toward and away from the pressure roller 21. An engaging portion of the housing of the fixing device 9 engages with the slide groove 53*a*. The relative movement of the engaging portion in the slide groove 53*a* enables the fixing belt 20 to move toward and away from the pressure roller 21.

The above-described arrangement of fasteners or the foregoing arrangement of the conductor 40 enables the conductor 40 to be in stable contact with the inner surface of the fixing belt 20. The fixing device can also be made compact, as described above.

In addition to the sheets P serving as plain paper, possible recording media include thick paper, postcards, envelopes, thin paper, coated paper (or art paper), tracing paper, overhead projector (OHP) transparencies, plastic film, prepreg, copper foil, and the like.

Aspects of the present invention are as described below, for example.

First Aspect

According to a first aspect, a fixing device includes:

a fixing rotator;

a pressure rotator that presses the fixing rotator to form a fixing nip between the pressure rotator and the fixing rotator;

a planar heater that contacts an inner surface of the fixing rotator;

a holder that holds the heater and guides the fixing rotator;

a conductor that is grounded and contacts the inner surface of the fixing rotator; and a support that supports the holder, the support having a shape of regulating rotation of the conductor.

Second Aspect

According to a second aspect, in the fixing device of the first aspect, the shape of regulating rotation includes a plurality of shapes of regulating rotation.

Third Aspect

According to a third aspect, in the fixing device of the first aspect or the second aspect, the shape of regulating rotation is a convex shape.

Fourth Aspect

According to a fourth aspect, in the fixing device of the first aspect or the second aspect, the shape of regulating rotation is a concave shape.

Fifth Aspect

According to a fifth aspect, in the fixing device of the first aspect or the second aspect, the shape of regulating rotation is a hole.

Sixth Aspect

According to a sixth aspect, in the fixing device of the first aspect or the second aspect, the shape of regulating rotation is a combination of two or more of a concave shape, a convex shape, and a hole.

Seventh Aspect

According to a seventh aspect, an image forming apparatus includes: the fixing device of any one of the first aspect to the sixth aspect.

Although the invention conceived of by the present inventors has been described hereinabove on the basis of embodiments, the present invention is not limited to or by the foregoing embodiments, and it is understood that various variations and modifications can be made without departing from the spirit of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device, comprising:

a fixing rotator;

a pressure rotator that presses the fixing rotator to form a fixing nip between the pressure rotator and the fixing rotator;

a planar heater that contacts an inner surface of the fixing rotator;

a holder that holds the heater and guides the fixing rotator;

a conductor that is grounded and contacts the inner surface of the fixing rotator; and a support that supports the holder, wherein the conductor includes a bent portion, and the support has a shape which penetrates the bent portion.

2. The fixing device according to claim 1, wherein the shape is a hole.

3. An image forming apparatus comprising the fixing device according to claim 1.

4. The fixing device according to claim 1, wherein the shape which penetrates the bent portion is a hole formed through the support.

5. The fixing device according to claim 4, wherein the bent portion of the conductor comprises an insertion portion configured to pass through the hole.

6. The fixing device according to claim 5, wherein the insertion portion is narrower than an adjacent portion of the conductor.

7. The fixing device according to claim 4, wherein the support includes a first hole and a second hole, and the bent portion of the conductor penetrates both the first hole and the second hole.

8. The fixing device according to claim 1, wherein the support is a metal stay.

9. The fixing device according to claim 1, wherein the conductor has a pointed end portion configured to contact the inner surface of the fixing rotator.

10. The fixing device according to claim 1, wherein the support is grounded via a resistor.

11. The fixing device according to claim 1, wherein the fixing rotator is an endless fixing belt.

12. The fixing device according to claim 1, wherein the planar heater comprises a plate-shaped base and a resistive heat generator on the base.

13. A fixing device, comprising:

a fixing rotator;

a pressure rotator that presses the fixing rotator to form a fixing nip between the pressure rotator and the fixing rotator;

a planar heater that contacts an inner surface of the fixing rotator;

a holder that holds the heater and guides the fixing rotator;

a conductor that is grounded and contacts the inner surface of the fixing rotator; and a support that supports the holder, wherein the conductor includes a bent portion, the support has a shape which extends in a direction intersecting a face of the bent portion, and the shape opposes a side face of the bent portion at a plurality of positions.

14. An image forming apparatus comprising the fixing device according to claim 13.

15. The fixing device according to claim 13, wherein the conductor is a flexible sheet.

16. The fixing device according to claim 13, wherein the support is a metal stay.

17. The fixing device according to claim 13, wherein the support is grounded via a resistor.

18. The fixing device according to claim 13, wherein the planar heater comprises a plate-shaped base and a resistive heat generator on the base.

19. The fixing device according to claim 13, wherein the conductor has a pointed end portion configured to contact the inner surface of the fixing rotator.

20. The fixing device according to claim 13, wherein the fixing rotator is an endless fixing belt.

* * * * *